United States Patent
Oulachgar et al.

(10) Patent No.: US 9,261,411 B2
(45) Date of Patent: Feb. 16, 2016

(54) UNCOOLED MICROBOLOMETER DETECTOR AND ARRAY FOR TERAHERTZ DETECTION

(71) Applicant: INSTITUT NATIONAL D'OPTIQUE, Quebec (CA)

(72) Inventors: Hassane Oulachgar, Quebec (CA); Philip Mauskopf, Scottsdale, AZ (US); Hubert Jerominek, Quebec (CA); Martin Bolduc, Quebec (CA); Samir Ilias, Quebec (CA); Christine Alain, Quebec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 484 days.

(21) Appl. No.: 13/720,317

(22) Filed: Dec. 19, 2012

(65) Prior Publication Data

US 2014/0166882 A1    Jun. 19, 2014

(51) Int. Cl.
  *G01J 5/20*    (2006.01)
  *G01N 21/35*  (2014.01)
  *G01J 5/08*    (2006.01)

(52) U.S. Cl.
  CPC . *G01J 5/20* (2013.01); *G01J 5/0834* (2013.01)

(58) Field of Classification Search
  USPC .................. 250/338.4, 338.1, 349
  See application file for complete search history.

(56) References Cited

U.S. PATENT DOCUMENTS

| | | | |
|---|---|---|---|
| 5,450,053 A | 9/1995 | Wood | |
| 6,329,655 B1 * | 12/2001 | Jack et al. | 250/338.1 |
| 7,439,508 B2 | 10/2008 | Bluzer et al. | |
| 7,557,349 B2 * | 7/2009 | Oda et al. | 250/341.1 |
| 2010/0276597 A1 | 11/2010 | Ouvrier-Buffet | |
| 2011/0304005 A1 * | 12/2011 | Brueckl | G01J 5/08 257/467 |
| 2012/0091342 A1 | 4/2012 | Berger et al. | |
| 2013/0087707 A1 * | 4/2013 | Park | G01J 5/023 250/338.4 |
| 2013/0161515 A1 * | 6/2013 | Park | G01J 5/0862 250/338.1 |
| 2014/0175284 A1 * | 6/2014 | Roh | G01J 5/0853 250/338.4 |

OTHER PUBLICATIONS

Logan, D. "A Frequency Selective Bolometer Camera for Measuring Millimeter Spectral Energy Distributions", May 1, 2009, Open Access Dissertations, University of Massachusetts—Amherst, http://scholarworks.umass.edu/open_access_dissertations.

U.S. Appl. No. 13/632,577, filed Oct. 1, 2012.

* cited by examiner

*Primary Examiner* — Casey Bryant
(74) *Attorney, Agent, or Firm* — Merchant & Gould P.C.

(57) ABSTRACT

An uncooled microbolometer detector that includes a substrate, a platform held above the substrate by a support structure, at least one thermistor provided on the platform, and an optical absorber. The optical absorber includes at least one electrically conductive layer extending on the platform over and in thermal contact with the at least one thermistor and patterned to form a resonant structure defining an absorption spectrum of the uncooled microbolometer detector. The optical absorber is exposed to electromagnetic radiation and absorbs the electromagnetic radiation according to the absorption spectrum. A microbolometer array including a plurality of uncooled microbolometer detectors arranged in a two-dimensional array is also provided. Advantageously, these embodiments allow extending the absorption spectrum of conventional infrared uncooled microbolometer detectors to the terahertz region of the electromagnetic spectrum.

13 Claims, 19 Drawing Sheets

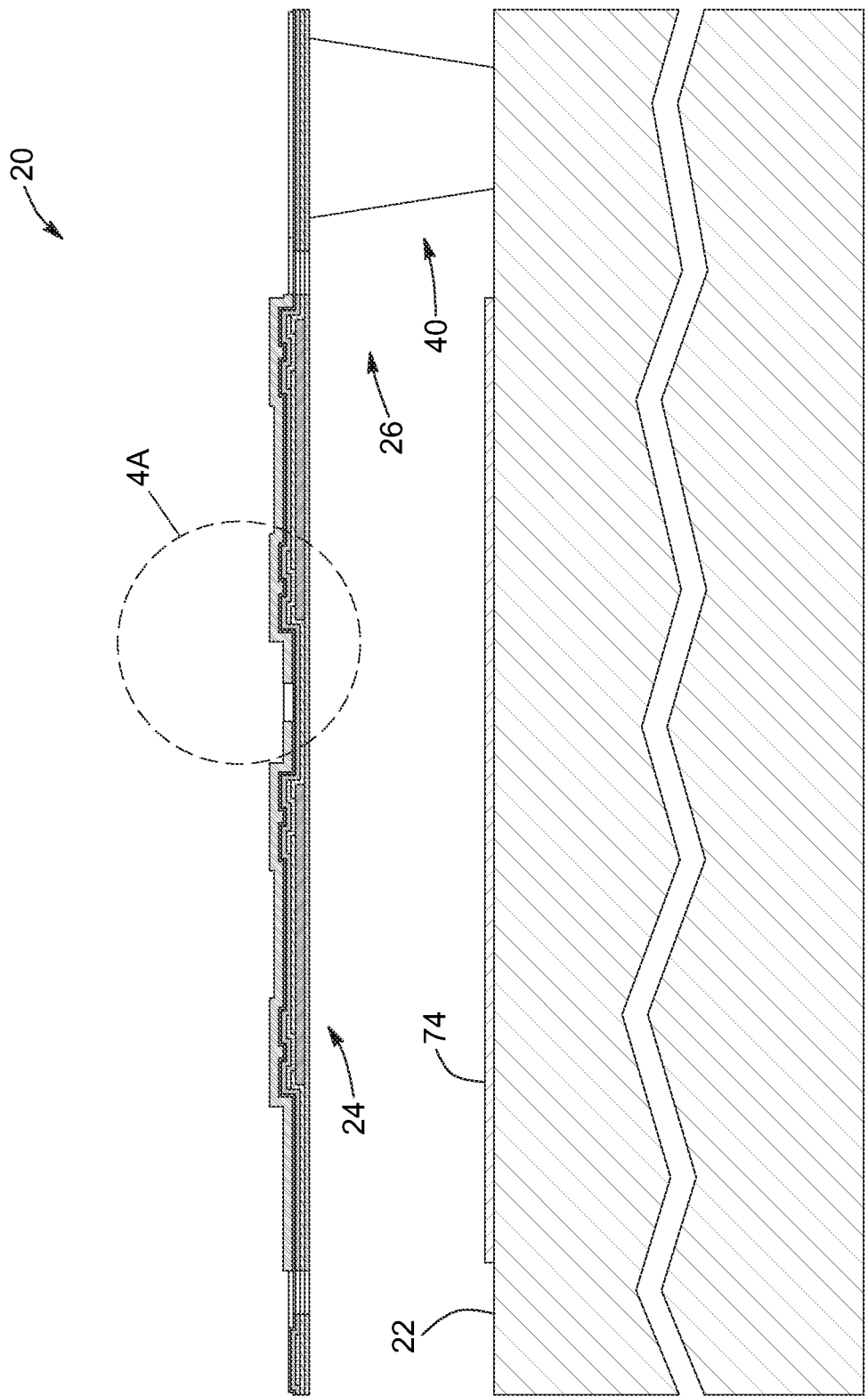

UNCOOLED MICROBOLOMETER DETECTOR AND ARRAY FOR TERAHERTZ DETECTION

FIELD OF THE INVENTION

The present invention relates to the field of uncooled microbolometer detectors, and more particularly concerns an uncooled microbolometer detector suitable for absorption and detection of terahertz radiation, and an array including a plurality of the same.

BACKGROUND OF THE INVENTION

Thermal detectors operate by absorbing energy from electromagnetic radiation incident thereonto and by converting the heat thus generated into an electrical signal representative of the amount of absorbed radiation. Perhaps the most prominent type of thermal detectors currently available is uncooled microbolometer detectors, usually shortened as microbolometers. A microbolometer is typically based on a suspended platform or bridge structure having a low thermal mass and on which is disposed a material having a temperature-dependent electrical resistance. The platform is generally held above and thermally insulated from a substrate by a support structure, and is provided with a thermistor, which is the resistive element whose electrical resistance changes in response to temperature variations caused by the absorbed radiation. The thermistor may, for example, be composed of a material having a high temperature coefficient of resistance (TCR) such as vanadium oxide and amorphous silicon.

Microbolometers are capable of operating at room temperature. Because they do not require cryogenic cooling, may be integrated within compact and robust devices that are often less expensive and more reliable than those based on cooled detectors.

Arrays of uncooled microbolometer detectors may be fabricated on a substrate using common integrated circuit fabrication techniques. Such arrays are often referred to as focal plane arrays (FPAs). In most current applications, arrays of uncooled microbolometers are used to sense radiation in the infrared portion of the electromagnetic spectrum, usually in the mid-wave infrared, encompassing wavelengths of between about 3 and 5 μm (micrometers), or in the long-wave infrared, encompassing wavelengths of between about 8 and 14 μm.

Such arrays are often integrated in uncooled thermal cameras for sensing incoming infrared radiation from a target scene. Each microbolometer detector of the array absorbs some infrared radiation resulting in a corresponding change in the microbolometer detector temperature, which produces a corresponding change in electrical resistance. A two-dimensional pixelated thermal image representative of the infrared radiation incident from the scene can be generated by converting the changes in electrical resistance of each microbolometer detector of the array into an electrical signal that can be displayed on a screen or stored for later viewing or processing. By way of example, state-of-the-art arrays of infrared uncooled microbolometer detectors now include 1024 by 768 pixel arrays with a 17-μm pixel pitch.

In the last decade, there has been a growing interest toward extending uncooled microbolometer spectroscopy and sensing applications beyond the traditional infrared range, namely in the far-infrared and terahertz (or sub-millimeter) spectral regions. As known in the art, these regions of the electromagnetic spectrum have long been relatively unused for industrial and technological purposes due to the lack of efficient techniques for detection and generation of radiation in this frequency range.

In this context, extending the absorption spectrum of uncooled microbolometers beyond 30 μm is not straightforward, since the materials used to fabricate the detectors absorb predominantly in the infrared, and because the pitch of terahertz-sensitive pixels is typically larger than that of infrared-sensitive pixels to avoid diffraction effects. In addition, to maximize radiation absorption in the desired spectral band, conventional infrared microbolometer detectors generally include a reflector deposited on the underlying substrate to form a quarter-wavelength Fabry-Perot optical resonant cavity with the suspended platform. However, forming such a quarter-wavelength resonant cavity is generally not practical from the point of view of surface micromachining techniques used in the microfabrication of uncooled microbolometer detecting electromagnetic radiation at wavelengths longer than 10 μm.

Therefore, there remains a need in the art for an uncooled microbolometer detector capable of absorbing electromagnetic radiation in the terahertz and far-infrared regions, while retaining at least some of the advantages of infrared detector technology in terms of cost, reliability, ease of fabrication, and maturity of the field.

SUMMARY OF THE INVENTION

According to an aspect of the invention, there is provided an uncooled microbolometer detector. The uncooled microbolometer includes:
  a substrate;
  a platform held above the substrate by a support structure;
  at least one thermistor provided on the platform; and
  an optical absorber including at least one electrically conductive layer extending on the platform over and in thermal contact with the at least one thermistor and patterned to form a resonant structure defining an absorption spectrum of the uncooled microbolometer detector, the optical absorber being exposed to electromagnetic radiation and absorbing the electromagnetic radiation according to the absorption spectrum.

In some embodiments, the at least one electrically conductive layer includes a first electrically conductive layer patterned to form a capacitive structure and a second electrically conductive layer patterned to form an inductive structure. In such embodiments, the absorption spectrum of the uncooled microbolometer detector can be controlled by adjusting the geometric properties of the pattern defined in the electrically conductive layers and the materials composing the same.

In some embodiments, the optical absorber is preferably configured to absorb the electromagnetic radiation in a wavelength range from about 30 to 3000 micrometers, corresponding to the terahertz region of the electromagnetic spectrum.

In some embodiments, the uncooled microbolometer detector further includes a spectral filter supported above the platform in a spaced relationship therewith. In such embodiments, the spectral filter is configured to pre-filter the electromagnetic radiation before the electromagnetic radiation impinges onto the optical absorber. In some embodiments, the spectral filter comprises a low-pass filter, preferably a capacitive structure, which prevents electromagnetic radiation with frequencies above a certain cutoff frequency from reaching the optical absorber.

According to another aspect of the invention, there is provided a microbolometer array including a plurality of uncooled microbolometer detectors as described above, wherein the plurality of uncooled microbolometer detectors is arranged in a two-dimensional array.

In some embodiments, the plurality of uncooled microbolometer detectors is divided in a number of subsets of uncooled microbolometer detectors, the absorption spectrum of the uncooled microbolometer detectors of each subset being different from one another.

Other features and advantages of the present invention will be better understood upon reading of preferred embodiments thereof with reference to the appended drawings.

BRIEF DESCRIPTION OF THE DRAWINGS

FIG. 4 is a cross-sectional view of the uncooled microbolometer detector shown in FIG. 1, taken along section line 4.

DESCRIPTION OF PREFERRED EMBODIMENTS OF THE INVENTION

Figure 1:
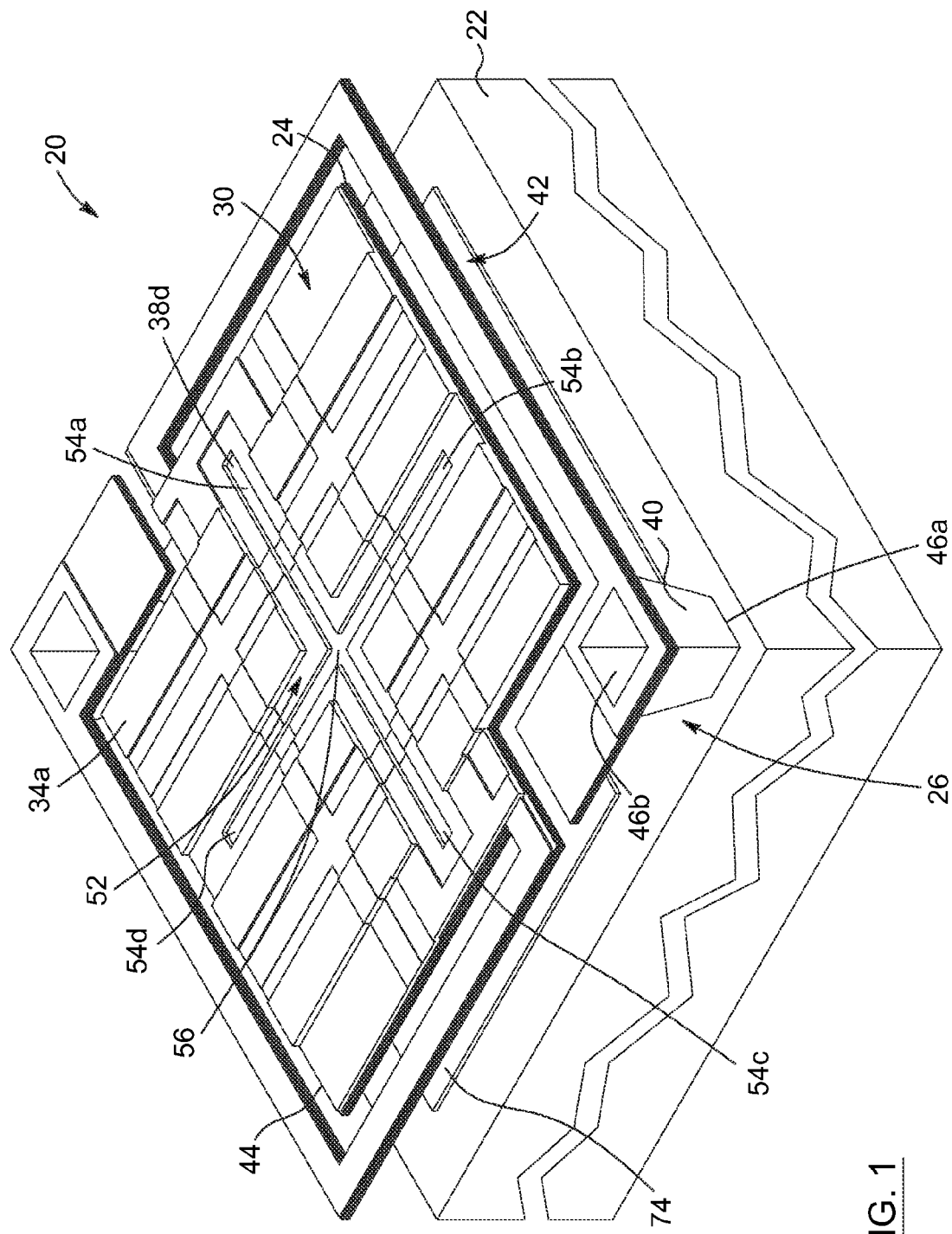
FIG. 1 is a schematic perspective view of an uncooled microbolometer detector in accordance with an embodiment of the invention.
Figure 2:
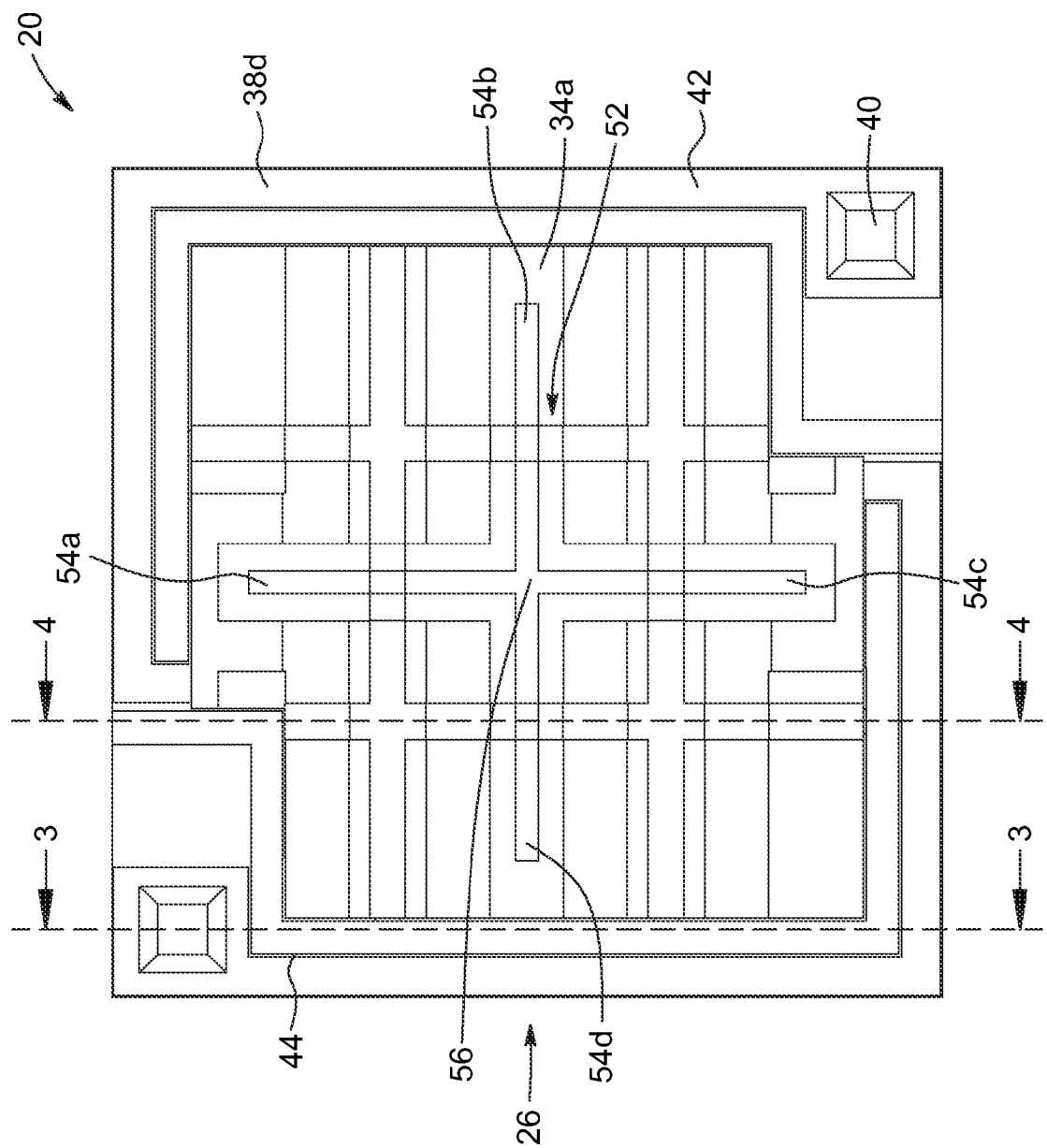
FIG. 2 is a top plan view of the uncooled microbolometer detector shown in FIG. 1.

In the following description, similar features in the drawings have been given similar reference numerals and in order to weigh down the figures, some elements may not be referred to on some figures if they were already identified in preceding figures. It should also be understood herein that the elements of the drawings are not necessarily drawn to scale and that the emphasis is instead being placed upon clearly illustrating the elements and structures of the present embodiments.

Embodiments of the present invention generally relate to an uncooled microbolometer detector including an optical absorber extending on a suspended platform structure and having an absorption spectrum that defines the absorption spectrum of the overall detector. The optical absorber may advantageously be optimized for detecting radiation in the terahertz (THz) region of the electromagnetic spectrum, while being disposed on a platform structure that is similar to that of conventional uncooled infrared microbolometer detectors.

Embodiments of the present invention also relate to an array including a plurality of such uncooled microbolometer detectors.

Uncooled Microbolometer Detector

According to an aspect of the invention, there is provided an uncooled microbolometer detector, an embodiment of which is shown in FIGS. 1 to 5 and 8. It is to be noted that, for the sake of simplicity, the expression "uncooled microbolometer detector" may in some instances be shortened to "uncooled microbolometer", "microbolometer detector" or simply "microbolometer".

Broadly described, the uncooled microbolometer detector 20 includes a substrate 22, a platform 24 held above the substrate 22 by a support structure 26, at least one thermistor 28 provided on the platform 24 and an optical absorber 30. Optionally, the microbolometer detector 20 may include an electrically conductive path 32 electrically connecting each thermistor 28 to electrical traces patterned on the substrate 22. The optical absorber 30 includes at least one electrically conductive layer 34a and 34b extending on the platform 24 over and in thermal contact with the at least one thermistor 28. The electrically conductive layers 34a and 34b are patterned, preferably according to the geometry of the platform 24, to form a resonant structure defining an absorption spectrum of the uncooled microbolometer detector 20, the optical absorber 30 being exposed to electromagnetic radiation and absorbing the electromagnetic radiation according to the absorption spectrum. As further explained below, adjusting the number, pattern geometry and materials properties of the electrically conductive layers 34a and 34b allows tailoring the profile and spectral position of the absorption spectrum of the uncooled microbolometer detector 20 so as to absorb at specific wavelengths of radiation, for example in the terahertz region.

Throughout the present description, the term "microbolometer" is understood to refer to an uncooled thermal radiation detector that operates by absorbing incident electromagnetic radiation and converting the absorbed radiation into heat. The microbolometer generally includes at least one thermistor, which is a resistive element whose electrical resistance changes in response to temperature variations caused by the absorbed radiation. This physical property is used to measure the energy or power carried by the radiation incident on the microbolometer. The microbolometer is generally thermally insulated from the substrate or surroundings to allow the absorbed incident radiation to generate a temperature change in the thermistor while being substantially unaffected by the temperature of the substrate. Microbolometers are generally fabricated on the substrate using integrated circuit fabrication techniques and have applications, among other fields, in night vision, thermal imaging, remote sensing, spectroscopy, and radiation detection.

As used herein, the term "uncooled" is intended to refer to microbolometer detectors that operate at or near ambient temperature, without any type of cryogenic cooling system.

As for most commonly known microbolometer structures, the microbolometer detector according to embodiments of the invention may be fabricated using conventional surface micromachining and photolithographic techniques. For example, in some embodiments, the microbolometer detector may be fabricated using a monolithic integration approach, wherein the substrate of the microbolometer detector, preferably provided with an electrical readout integrated circuitry (ROIC), is pre-manufactured using standard complementary metal-oxide-semiconductor (CMOS) processes. More particularly, it is an advantage of embodiments of the present invention to provide uncooled microbolometer detectors whose absorption spectrum selectively absorbs radiation having wavelengths longer than the wavelengths of infrared radiation but whose fabrication process is carried out using techniques similar to those of common use for manufacturing infrared microbolometers.

In such embodiments, the platform, the support, the thermistors and the optical absorber of the uncooled microbolometer detector may successively be deposited and patterned on the substrate using common thin-film deposition techniques paired with selective photoresist and sacrificial layer etching processes. However, it will be understood that the uncooled microbolometer detector according to embodiments of the invention may be fabricated using other manufacturing techniques, for example bulk micromachining, without departing from the scope of the invention.

In this regard, FIGS. 8A to 8J illustrate an embodiment of the uncooled microbolometer detector 20 wherein one or more overlying components thereof are removed in order to better illustrate the underlying components. It will be noted that FIGS. 8A to 8J may correspond to the uncooled microbolometer detector 20 at different steps of the fabrication process thereof.

Substrate

Still referring to FIGS. 1 to 5 and 8, the uncooled microbolometer detector 20 first includes a substrate 22. The substrate 22 may be made of silicon (Si), silicon carbide (SiC), gallium arsenide (GaAs), germanium (Ge) or any other suitable substrate material that may, but need not, support integration of semiconductor devices.

As mentioned above, the substrate 22 may be provided with an electrical readout integrated circuitry 36 (see, e.g., FIG. 3A), which may be embodied, for example, by one or more CMOS circuitry layers formed on or in the substrate 22 according to conventional CMOS processes. Alternatively, the electrical readout integrated circuitry 36 may be provided external to the substrate 22. Moreover, the substrate 22 may be a multilayered structure made of several dielectric, semiconductor and metallic layers including, but not limited to, a radiation reflecting layer, one or more protective dielectric layers, and electrical contacts for electrical connection with the electrical readout integrated circuitry 36.

Platform and Support Structure

As illustrated in FIGS. 1 to 5 and 8, the uncooled microbolometer detector 20 also includes a platform 24 held above the substrate 22 by a support structure 26.

As used herein, the term "platform" generally refers to a substantially planar and rigid structure or membrane supported by the support structure and generally having greater horizontal dimensions than vertical thickness. In this regard, it will be readily understood that throughout the present description, the terms "vertical" and "vertically" refer to a direction perpendicular to a plane parallel to the conventional plane or surface of the substrate. Likewise, the terms "horizontal" and "horizontally" are used to refer to directions lying in a plane which is perpendicular to the vertical direction as just defined. Both terms are not meant to refer to a particular orientation of the uncooled microbolometer detector.

The platform 24 preferably provides thermal isolation to each thermistor 28 by minimizing heat transfer through thermal conduction. The platform 24 may be shaped as a substantially rectangular single or multilayer thin film, which preferably includes electrically insulating and low-stress materials. Suitable materials for inclusion in the platform 24 include, without limitation, silicon nitride and silicon dioxide. In some embodiments, the platform 24 may have horizontal dimensions selected between about 10 and 1000 µm, and it may have a vertical thickness selected in the range of about 0.1 to 1 µm.

The platform 24 may generally be formed on top of a sacrificial layer (not shown), which may be deposited on the substrate 22 during the fabrication process of the uncooled microbolometer detector 20 and be subsequently patterned, selectively etched and sacrificially removed, for example in an oxygen plasma.

Figure 4A:
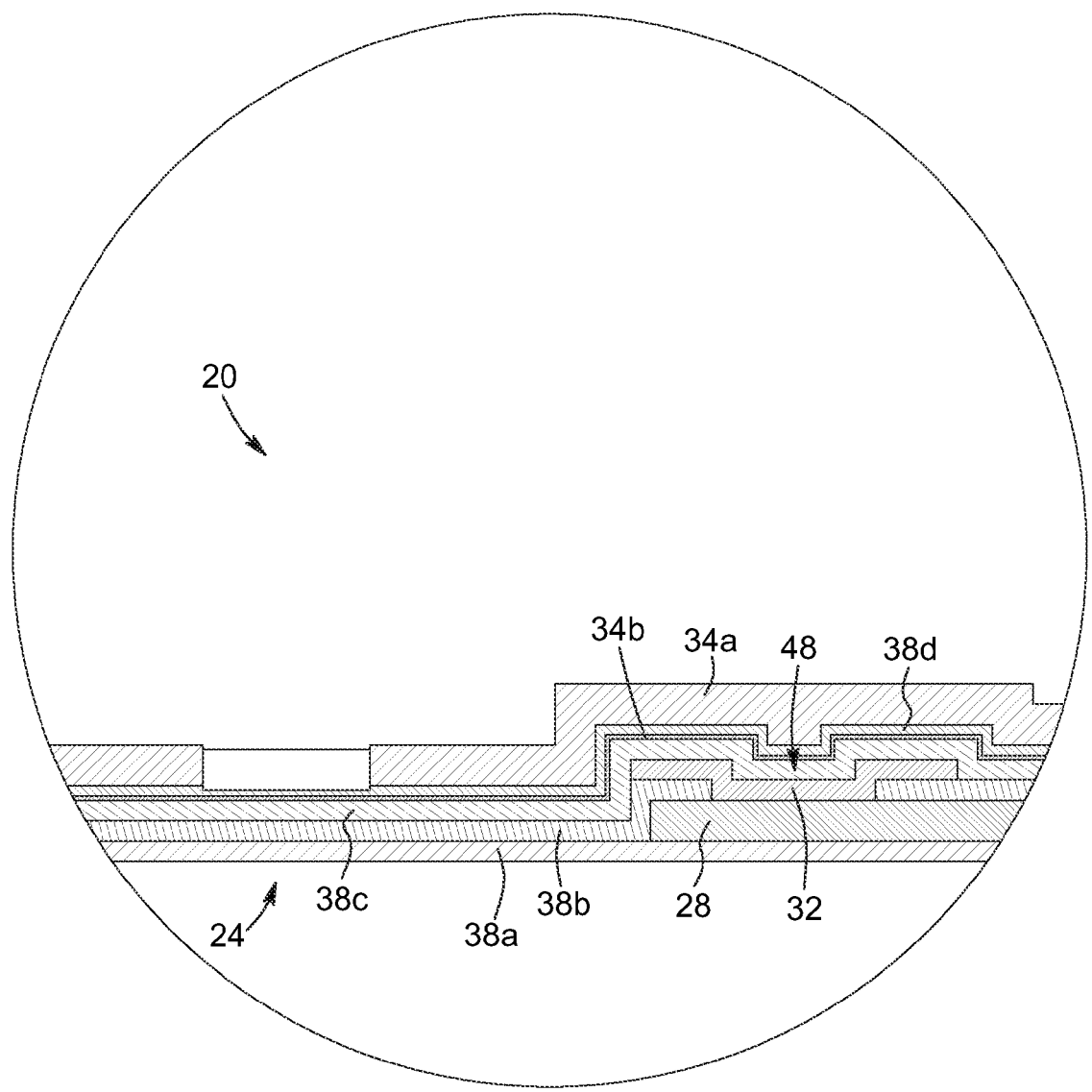
FIG. 4A is an enlargement of portion 4A of FIG. 4.
Figure 5:
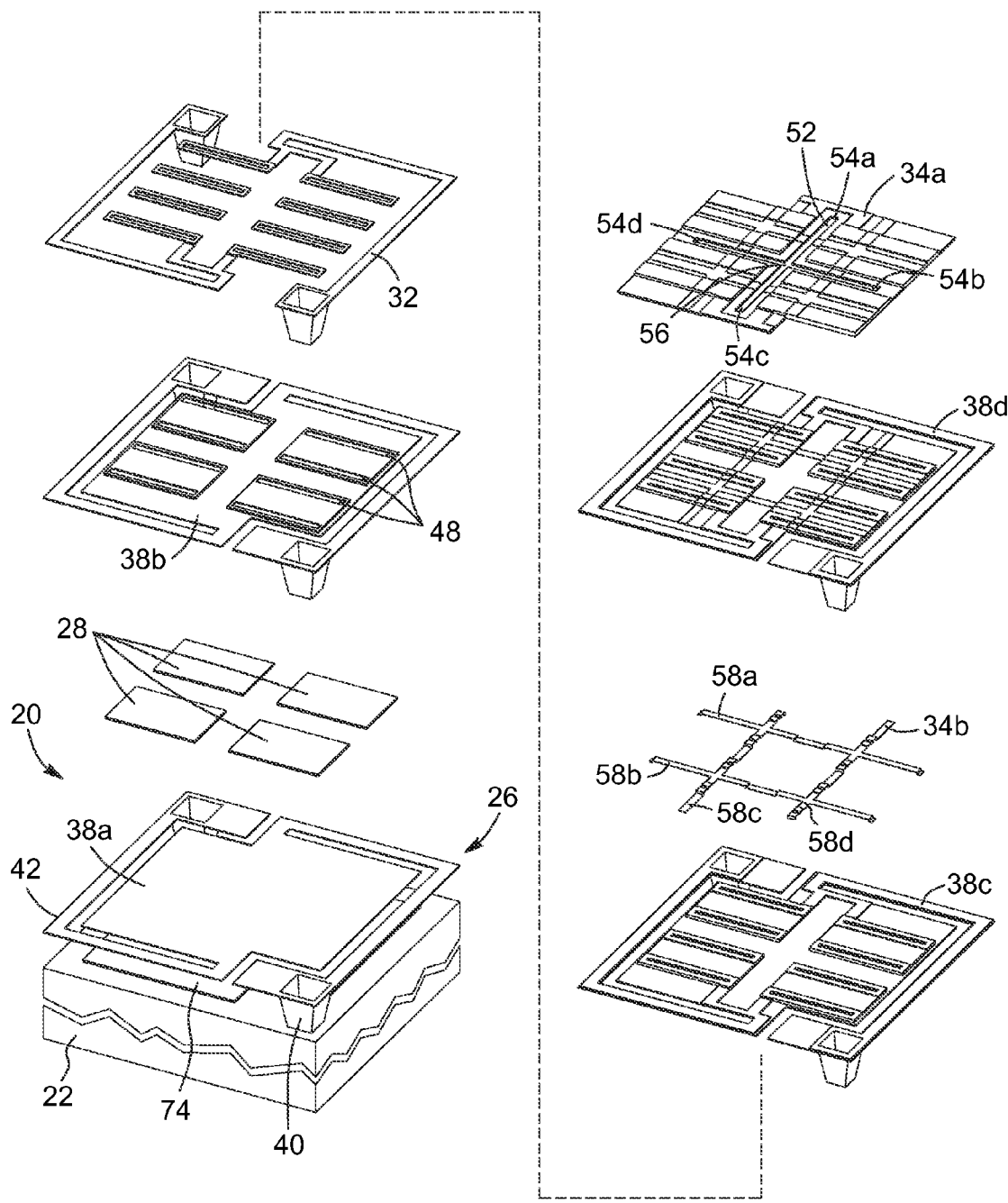
FIG. 5 is a partially exploded perspective view of the uncooled microbolometer detector shown in FIG. 1.

As best seen in FIG. 4A, in the illustrated embodiment the platform 24 preferably includes four vertically stacked dielectric layers 38a to 38d. These four dielectric layers 38a to 38d provide mechanical rigidity and a physical separation between the at least one thermistor 28, the electrically conductive path 32, and each electrically conductive layer 34a and 34b of the optical absorber 30, each of which will be described in further detail hereinbelow. However, it will be understood that depending on the intended application of the uncooled microbolometer detector 20, the platform 24 may take a variety of shapes, dimensions and configurations without departing from the scope of the invention.

It is to be noted that, in contrast to common uncooled infrared microbolometer detectors whose absorption waveband is determined essentially by the infrared absorption properties of the material making up the platform (e.g. silicon nitride), in embodiments of the invention, the absorption spectrum of the microbolometer detector 20 is defined by that of the optical absorber 30, as described hereinbelow. As a result, the platform 24 is primarily intended for supporting and providing thermal isolation to the one or more thermistors 28, and need not, but could, be made of an optically absorbing material optimized for absorption in a specific wavelength range of interest.

The term "support structure" as used herein refers broadly to a structure that holds and mechanically supports the platform of the uncooled microbolometer detector in a spaced relationship above the substrate.

It may be advantageous for the support structure 26 to provide enough mechanical rigidity and strength for maintaining the platform 24 of the microbolometer detector 20 at a height of between about 1 and 10 µm from the substrate 22. It will also be understood that, in addition to providing mechanical support and thermal isolation, the support structure 26 may also provide electrical connection of each thermistor 28 and to the substrate 22, as discussed hereinbelow.

Figure 3:
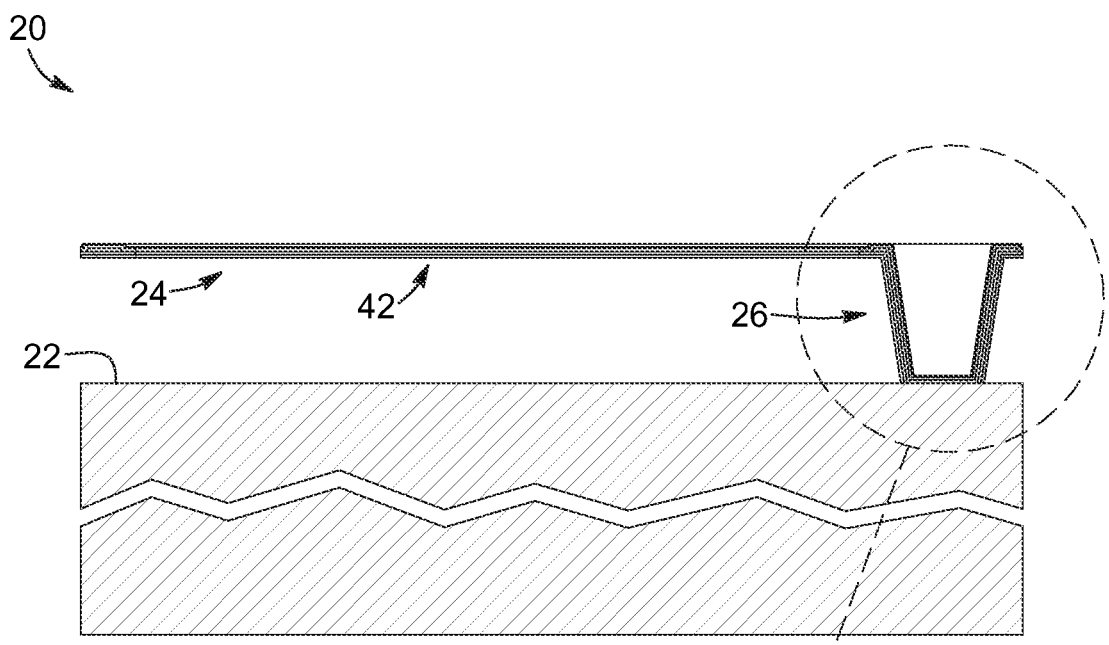
FIG. 3 is a cross-sectional view of the uncooled microbolometer detector shown in FIG. 1, taken along section line 3.
Figure 3A:
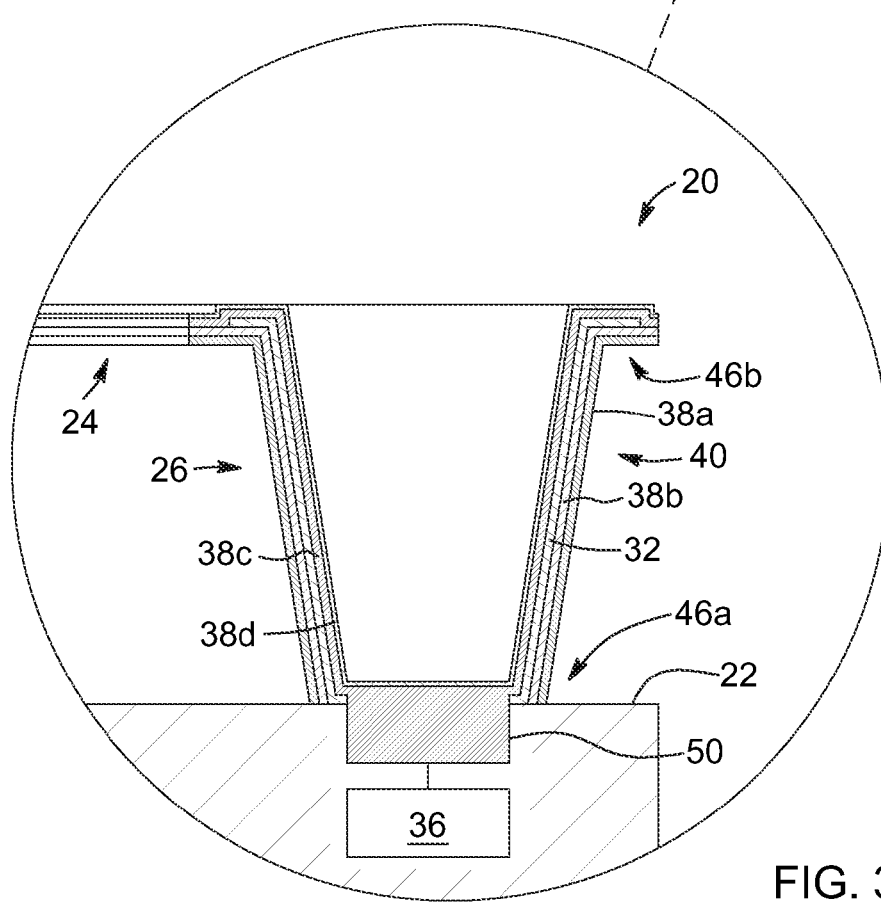
FIG. 3A is an enlargement of portion 3A of FIG. 3.

Referring more particularly to FIGS. 3 and 3A, the support structure 26 generally includes posts 40 and arms 42. As used herein, the term "post" refers generally to a structural element of the support structure that extends mainly vertically along a height thereof from the substrate. In particular, the height of each post essentially defines the spacing between the platform and the substrate. In contrast, the term "support arm"

refers broadly to a structural element of the support structure that extends mainly horizontally.

As for the platform 24, the support structure 26 is preferably made of a low-stress and self-supporting material, for example silicon nitride or silicon dioxide, which may be provided in the form of one or more thin-film layers, and having for example a thickness of about 0.1 to 1 µm. The support structure 26 is generally fabricated concurrently with the platform 24, such that the support structure 26 and platform 24 may share one or more material layers. As better illustrated in FIG. 3A, the four dielectric layers 38a to 38d of the platform 24 extends outwardly and downwardly therefrom to form the outermost layers 38a and 38b and innermost layers 38c and 38d of the posts 40 and support arms 42 that sandwich a portion of the electrically conductive path 32 that provides an electrical link between each thermistor 28 and the substrate 22.

In the illustrated embodiment, the support structure 26 is generally disposed along an outer perimeter 44 of the platform 24. The support structure 26 includes two posts 40 connected to and projecting substantially vertically from the substrate 22. Each post 40 includes a proximal end 46a connected to the substrate 22 and a distal end 46b terminating near the outer perimeter of the platform 24 and connected to the support arms 42.

However, one of ordinary skill in the art will understand that the general configuration and disposition of the support structure 26 should not be construed so as to limit the scope of the present invention. For example, in order to meet the thermal, mechanical and electrical constraints of various applications, each post 40 of the support structure 26 may have a variety of lengths and cross-section shapes and dimensions, which are all considered being within the scope of the present invention. Similarly, the support structure 26 need not be provided outwardly of the platform 24 but may be disposed completely or partially underneath the platform 24, such as the support structure shown in U.S. patent application Ser. No. 13/632,577 entitled "Microbolometer detector with centrally-located support structure". In arrays of uncooled microbolometer detectors, such configurations may provide a higher fill factor for optical absorption while simultaneously mitigating diffraction effects. In addition, depending on the specific application involved, both single-level and multiple-level platform configurations are possible. Furthermore, the support arms 42 need not be straight, but may also include transverse sections and be arranged according to meandering or serpentine configurations. Such geometric patterns allow increasing the effective length of support arms 42 and hence the thermal isolation they provide to the platform 24 and to the at least one thermistor 28 provided thereon.

Thermistors

Still referring to FIGS. 1 to 5 and 8, the microbolometer detector 20 also includes at least one thermistor 28 provided on the platform 24.

As used throughout the present description, the term "thermistor" generally refers to an uncooled thermally sensitive resistor and is meant to encompass any suitable material, structure or device having an electrical resistance that changes as a function of its temperature, preferably in a predictable and controllable manner.

Each thermistor 28 may be made of a material having a high TCR near room temperature, preferably of at least 0.5% per kelvin, including but not limited to a vanadium oxide material, an amorphous silicon material and a titanium oxide material. However, it will be understood that the composition of each thermistor 28 is not limited to those cited above. Any material or combination of materials having a suitable TCR is considered to be encompassed within the scope of the present invention.

In the illustrated embodiment, the uncooled microbolometer detector 20 includes four thermistors 28 disposed between first and second dielectric layers 38a and 38b of the platform 24. Moreover, each thermistor 28 is embodied by a thin film element having a substantially rectangular shape with a width, length and thickness which may be selected according to a desired electrical resistance of the corresponding thermistor 28. Of course, each thermistor 28 may have various shapes and sizes and may be disposed on the platform according to various configurations without departing from the scope of the invention.

The at least one thermistor 28 of the microbolometer detector 20 may be deposited onto the platform 24 using common deposition techniques such as evaporation, sputtering, spin coating or any other appropriate thin-film transfer technique. Likewise, the size, shape and disposition of each thermistor 28 may be subsequently delineated by means of various selective wet and dry etching techniques combined with photolithographic processes.

Electrically Conductive Path

Still referring to FIGS. 1 to 5 and 8, and as briefly discussed above, the uncooled microbolometer detector 20 preferably includes an electrically conductive path 32 electrically connecting each thermistor 28 provided on the platform 24 to the substrate 22.

As shown in the illustrated embodiment, the electrically conductive path 32 preferably establishes electrical contact with the thermistors 28 via contact openings 48 (see, e.g., FIGS. 4A, 5, 8C and 8D) defined in the second dielectric layer 38b and extends along the support arms 42 and posts 40 down to the substrate 22. As mentioned above, the substrate may include an electrical readout integrated circuitry 36 (see, e.g., FIG. 3A) electrically connected to the electrically conductive path 32, for example by means of via openings 50 lithographically defined at the bottom of each post 40 during the fabrication process of the uncooled microbolometer detector 20.

The electrically conductive path 32 may be deposited and delineated using known microfabrication techniques and may be made of any material having a suitable electrical conductivity including, without limitation, gold, aluminum, titanium, copper, silver, tungsten, chrome and vanadium. It will be understood that the width and thickness of the electrically conductive path 32 along the length thereof may be adjusted to procure a thermal conductance and an electrical resistance that optimize the performance of the uncooled microbolometer detector 20. In the illustrated embodiment (see FIGS. 3A and 4A), a third dielectric layer 38c of the platform is preferably deposited over the electrically conductive path 32 for protecting the same. It will also be understood that, in embodiments provided with more than one thermistor 28, it may be possible to adjust the equivalent resistance of the plurality of thermistors 28 by connecting the plurality of thermistors 28 in one of a series, parallel and series-parallel circuit schemes.

Optical Absorber

Referring back to FIGS. 1 to 5 and 8, the uncooled microbolometer detector 20 also includes an optical absorber 30 exposed to and absorbing electromagnetic radiation incident onto the uncooled microbolometer detector 20.

As used herein, the term "optical absorber" is intended to refer to a material or structure that can, upon exposure to certain wavelengths of electromagnetic radiation, absorb electromagnetic energy (i.e. photons) from the incident wave and convert the same into thermal energy. The term "optical"

used herein refers generally to the electromagnetic spectrum and is not limited to the visible or to another portion of the electromagnetic spectrum.

The optical absorber 30 includes at least one electrically conductive layer 34a and 34b extending on the platform 24 over and in thermal contact with the thermistors 28. In the illustrated embodiment, the optical absorber 30 preferably includes first and second electrically conductive layers 34a and 34b. However, in other embodiments, the optical absorber may alternatively include only one or more than two electrically conductive layers without departing from the scope of the invention, as discussed in further detail below.

As used herein, the term "electrically conductive layer" is intended to refer a layer, a film or a coating applied in any suitable manner so as to extend on the platform over the at least one thermistor, such that each layer includes an electrically conductive material. The one or more electrically conductive layers 34a and 34b may for instance be a metal, including a metal alloy, a semiconductor material (either doped or undoped), or any appropriate electrically conductive material. It will be understood that by virtue of their inherent electrical conductivity, the electrically conductive layers 34a and 34b of the optical absorber 30 behave as lossy inductive and capacitive elements that can convert the incident electromagnetic radiation into thermal energy via resonance effect.

As used herein, the term "thermal contact" generally means that heat conduction occurs directly or indirectly between two components, that is, the two components may be in direct contact with each other or may have a sufficiently thermally conducting material provided between them. More specifically, the term "thermal contact" is intended to refer to the fact that when the optical absorber 30 is heated upon absorption of electromagnetic radiation, the heat generated thereby is conducted or transmitted to each thermistor 28.

It will also be understood that the term "over" in specifying the spatial relationship of the optical absorber 30 relative to the thermistors 28 denotes that the optical absorber 30 is either in direct contact with or separated by one or more intervening layers from the upper surface of the thermistors 28. For example, in the embodiment of FIGS. 1 to 5 and 8, the optical absorber 30 and the four thermistors 28 are separated from each other by the second dielectric layer 38b, the electrically conductive path 32 and the third dielectric layer 38c.

The electrically conductive layers 34a and 34b are patterned to form a resonant structure defining an absorption spectrum of the uncooled microbolometer detector 20 such that upon exposure to electromagnetic radiation, the optical absorber 30 absorbs the electromagnetic radiation according to the absorption spectrum.

As used herein, the term "pattern" is intended to refer to a geometric arrangement or configuration of one or more features formed, inscribed or otherwise defined in each electrically conductive layer 34a and 34b. The features may be lines, squares, circles, grids, crosses or any other shapes, or combinations thereof (see FIGS. 9A to 9H). The features may be delineated in the electrically conductive layers 34a and 34b by any appropriate etching, patterning or deposition processes, or combinations thereof. Moreover, it will be understood that the term "pattern" may, but need not, be a regular or predictable arrangement but may include irregular arrangements as long as the resulting pattern form a resonant structure that define the absorption spectrum of the uncooled microbolometer detector 20.

As used herein, the term "resonant structure" is intended to refer to a structure which provides resonance conditions for the absorption of electromagnetic radiation in one or more wavelength bands. In other words, the resonant structure is designed in a manner such that electromagnetic radiation within one or more specific wavelength bands is selectively absorbed while any electromagnetic radiation of wavelength out of the one or more bands is reflected by or transmitted through the resonant structure.

The resonant structure has an absorption spectrum that defines the absorption spectrum of the uncooled microbolometer detector as a whole. Throughout the present description, the term "absorption spectrum" is intended to refer to a spectrum of electromagnetic energy over a range of wavelengths whose intensity at each wavelength corresponds to a measure of the fraction of electromagnetic radiation that is absorbed by the optical absorber of the uncooled microbolometer detector. The absorption spectrum may include one or more absorption bands within which electromagnetic radiation is predominantly absorbed. Each absorption band may exhibit one or more absorption peaks, each peak corresponding to a resonance wavelength of the resonant structure. In embodiments of the invention, the absorption spectrum generally depends on the geometry of the pattern forming the resonant structure and on the materials properties, the spacing of the electrically conductive layers, and also on the height of the Fabry-Perot cavity formed between the platform and the substrate of the uncooled microbolometer detector.

Referring to FIGS. 1 to 5 and 8, in some embodiments, the geometric and material parameters of the optical absorber 30 may be optimized for detecting radiation in the terahertz region of the electromagnetic spectrum, while advantageously being provided on a microbolometer detector 20 having a substrate 22, a platform 24, a support structure 26 and thermistors 28 that are similar to those of conventional infrared microbolometer detectors. As used herein the term "terahertz radiation" refers to electromagnetic radiation having wavelengths in a range between about 30 µm and 3000 µm, corresponding to frequencies ranging from approximately 0.1 THz to 10 THz.

However, while particularly useful for terahertz applications, one of ordinary skill in the art will understand that embodiments of the invention could additionally or alternatively be used in other regions of the electromagnetic spectrum, for example in the infrared and visible regions, without departing from the scope of the invention. It will be understood that as the wavelength of the electromagnetic radiation detected by the microbolometer detector decreases, the characteristic size of the geometrical parameters of the optical absorber decreases accordingly. In particular, the design of the optical absorber is generally limited mainly by the minimum critical dimension of the pattern that can be defined on the electrically conductive layers by the fabrication process of the microbolometer detector.

In some embodiments, the pattern defined by each of the electrically conductive layers 34a and 34b of the optical absorber 30 may preferably be selected so as to form either a capacitive structure or an inductive structure. For example, in the illustrated embodiment, the first electrically conductive layer 34a is patterned to form a capacitive structure and the second electrically conductive layer 34b is patterned to form an inductive structure.

As known in the art, the characterization of such structures as inductive or capacitive may be derived from the lumped circuit elements comprising an equivalent circuit for approximating their spectral characteristics (e.g. reflection, transmission and absorption) to electromagnetic radiation incident thereonto. More particularly, a capacitive structure generally behaves as a low-pass filter and may be constructed using an array or grid of patch elements, while an inductive structure generally behaves as a high-pass filter and may be constructed using an array or grid of aperture or slot elements. Referring to FIGS. 9A to 9H, there are shown examples of capacitive and inductive structures that can be patterned into the first and second electrically conductive layers 34a and 34b, respectively. However, it is to be understood that these exemplary capacitive and inductive structures are given for purposes of illustration only and are not to be construed as limiting the scope of the invention.

Referring back to FIGS. 1 to 5 and 8, the capacitive and inductive structures are preferably stacked one over the other in order to form a capacitive-inductive resonant circuit defining the resonant structure of the optical absorber 30. In such embodiments, the absorption spectrum of the optical absorber 30 generally depends on the geometry and composition of the capacitive and inductive structures, that is, of the first and second electrically conductive layers 34a and 34b. By adjusting these parameters, it is possible to tailor the peak position, peak value, width and shape of the absorption spectrum of the optical absorber 30, and thus of the uncooled microbolometer detector 20 as a whole. In the illustrated embodiment, the capacitive structure patterned in the first electrically conductive layer 34a is disposed over the inductive structure patterned in the second electrically conductive layer 34b.

However, in other embodiments, the inductive structure may be disposed over the capacitive structure without departing from the scope of the present invention.

It is also to be noted that while in some embodiments the optical absorber combines individual capacitive and inductive structures respectively formed in two distinct electrically conductive layers, in other embodiments the optical absorber may include more than two electrically conductive layers, each being patterned to a capacitive or and inductive structure. Such multilayer configurations may be useful for providing an uncooled microbolometer detector with a more complex absorption spectrum, for example with a plurality of absorption bands and absorption peaks at specific frequencies of interest.

In other embodiments, the optical absorber may be provided with a single electrically conductive layer patterned into either a capacitive or inductive structure. For example, in one embodiment, the optical absorber may include a single electrically conductive layer patterned to form a capacitive structure. In such an embodiment, the resonant structure of the optical absorber may be formed by combining the capacitive structure patterned in the electrically conductive layer with an inductive structure defined by the Fabry-Perot cavity formed between the platform and a radiation reflecting mirror provided on the substrate of the uncooled microbolometer detector. Alternatively, in other embodiments, the optical absorber may be provided with a single electrically conductive layer into which are patterned both a capacitive and an inductive structure.

Still referring to FIGS. 1 to 5 and 8, the capacitive structure may preferably include a cross-shaped slot 52 patterned through the first electrically conductive layer 34a, while the inductive structure may include inductive elements 58a to 58d patterned in the second electrically conductive layer 34b and electromagnetically coupled to the cross-shaped slot 52. In the illustrated embodiment, the cross-shaped slot 52 has four arms 54a to 54d extending outwardly from a center 56 thereof, with adjacent arms 54a to 54d extending at right angles relative to each other. Furthermore, each inductive element 58a to 58d is shaped as an elongated electrically conductive segment that extends substantially orthogonally across a corresponding one of the four arms 54a to 54d of the cross-shaped slot 52. Furthermore, the optical absorber 30 may, but need not, include an electrically insulating layer 38d disposed between the first and second electrically conductive layers 34a and 34b, for example as an etch stop layer, and corresponding to the fourth dielectric layer 38d introduced above.

The cross-shaped slot 52 patterned through the first electrically conductive layer 34a and the inductive elements 58a to 58d patterned in the second electrically conductive layer 34b are electromagnetically coupled to each other so as to form the resonant structure of the optical absorber 30 of the uncooled microbolometer detector 20. The absorption spectrum of the uncooled microbolometer detector 20 will depend on the geometric parameters of the capacitive and inductive structures patterned into the first and second electrically conductive layers 34a and 34b such as:

the length and width of the arms 54a to 54d of the cross-shaped slot 52;
the length and width of the inductive elements 58a to 58d and their position relative to the arms 54a to 54d of the cross-shaped slot 52;
the vertical spacing between the first and second electrically conductive layers 34a and 34b, which corresponds to the thickness of the fourth dielectric layer 38d; and
the gap between the optical absorber 30 and the radiation reflecting mirror optionally provided on the substrate.

Moreover, the absorption spectrum of the uncooled microbolometer detector 20 will also depend on the material composition of the first and second electrically conductive layers 34a and 34b, in particular their electrical conductivity, which can be frequency-dependent and influence the value of the complex impedance of each electrically conductive layer 34a and 34b.

One of ordinary skill in the art will thus recognize that by adjusting these geometrical and material parameters, it may be possible to control the profile (e.g. the shape, width and peak value) and position of the absorption spectrum of the uncooled microbolometer detector 20 so as to absorb specific wavelengths of radiation, for example terahertz radiation.

Figure 12A:
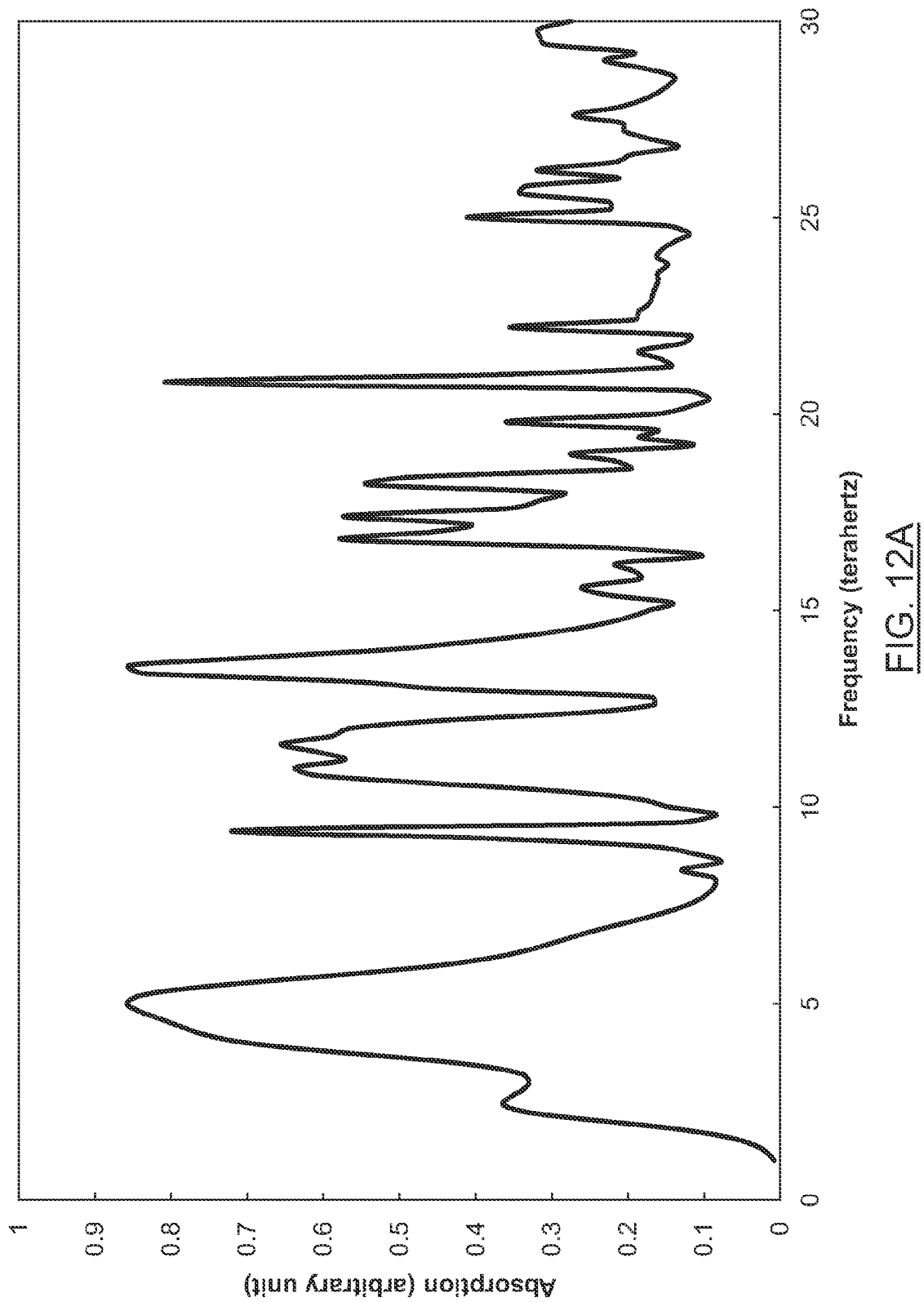
FIGS. 12A and 12B are theoretical absorption spectra plotted as a function of frequency in the terahertz region for the uncooled microbolometer detector shown in FIG. 1 (FIG. 12A without a spectral filter) and in FIG. 6 (FIG. 12B with a spectral filter).

For example, referring to FIG. 12A, there is shown a theoretical calculation of the absorption spectrum of the uncooled microbolometer detector shown in FIG. 1 and including a first electrically conductive layer patterned into a cross-shaped capacitive structure and second electrically conductive layer patterned into an inductive structure. As can be seen from the illustrated spectrum, the uncooled microbolometer detector exhibits a main absorption peak near 5 THz.

Radiation Reflecting Mirror

Referring back to FIGS. 1, 4, 5 and 8, and as mentioned above, the uncooled microbolometer detector 20 may include a radiation reflecting mirror 74 provided on the substrate 22 and disposed under the platform 24. The radiation reflecting mirror 74 has a reflecting surface that faces the underside of the platform 24. The radiation reflecting mirror 74 may be a thin metal film, for example a thin aluminum film, which can be deposited on the substrate 22 during the fabrication process of the uncooled microbolometer detector 20.

It will be understood by one of ordinary skill in the art that the radiation reflection mirror 74 provided on the substrate 22 may form a Fabry-Perot cavity with the platform 24 disposed thereabove, which may enhance the absorption of electromagnetic radiation by the optical absorber 30 by modifying the overall impedance of the uncooled microbolometer detector 20.

More specifically, the radiation reflecting mirror 74 may provide additional absorption by reflecting back into the optical absorber 30 the electromagnetic radiation which the optical absorber 30 is configured to absorb but which has not been absorbed on its first passage therethrough. Preferably, the radiation reflecting mirror 74 extends on the substrate 22 so as to cover most of the area underneath the platform 24 to maximize the back reflection level.

Additionally or alternatively, the radiation reflecting mirror 74 may be configured not to reflect any electromagnetic radiation of wavelength out of the one or more absorption bands of the optical absorber 30.

For example, in an embodiment of the uncooled microbolometer detector 20 optimized for detecting radiation in the terahertz region of the electromagnetic spectrum, the radiation reflecting mirror 74 may be configured to reflect electromagnetic radiation within one or more specific frequency bands in the terahertz region, while absorbing or transmitting to the substrate 22 the electromagnetic radiation of frequency out of the one or more specific frequency bands, in particular, the infrared radiation.

In order to provide more degrees of freedom to tailor the reflection, transmission and absorption properties of the radiation reflecting mirror 74 in one or more spectral bands of interest, it will be understood that the radiation reflecting mirror 74 may be patterned into specific geometries based on principles similar to those described above in reference to the optical absorber 30 of the uncooled microbolometer detector 20.

Spectral Filter

Figure 6:
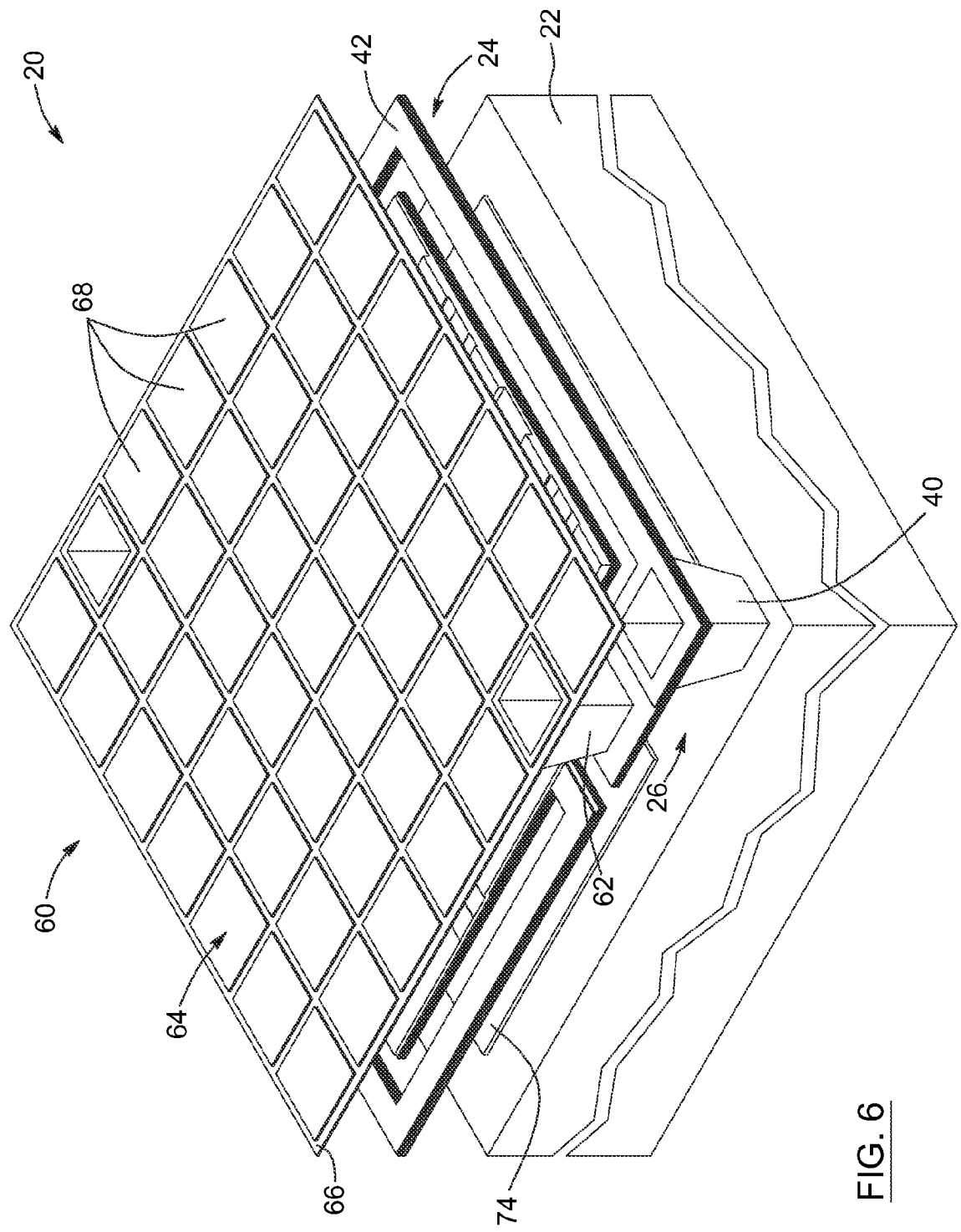
FIG. 6 is a schematic perspective view of an uncooled microbolometer detector including a spectral filter supported above the platform, in accordance with an embodiment of the invention.
Figure 7:
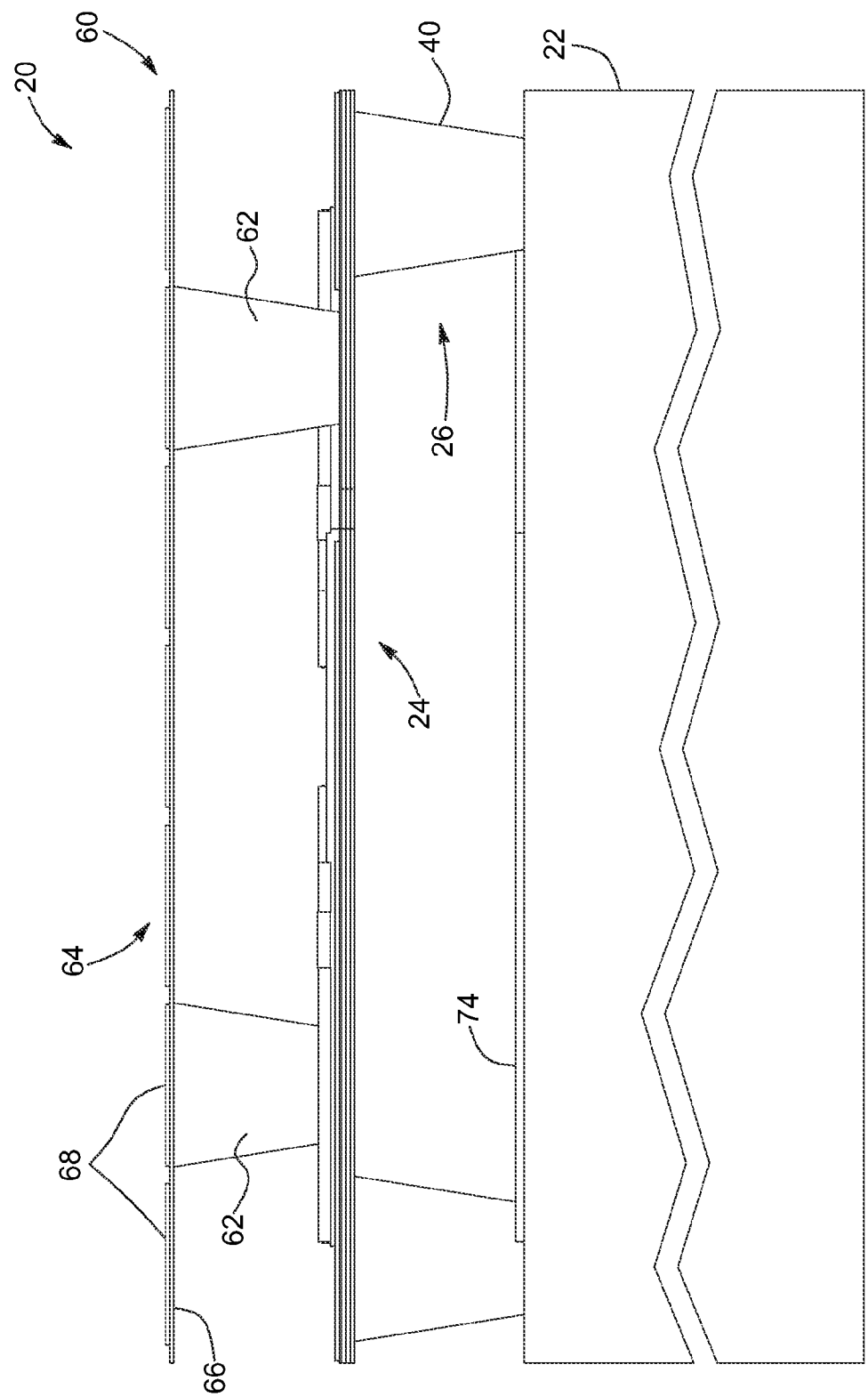
FIG. 7 is a side elevation view of the uncooled microbolometer detector shown in FIG. 6.
Figure 8A:
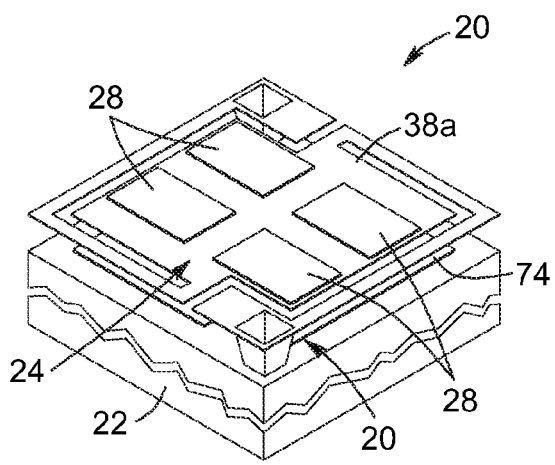
FIGS. 8A, 8C, 8E, 8G and 8I are schematic perspective views of the uncooled microbolometer detector shown in FIG. 1, wherein one or more overlying components of the uncooled microbolometer detector are removed therefrom in order to better illustrate the underlying components.
Figure 8B:
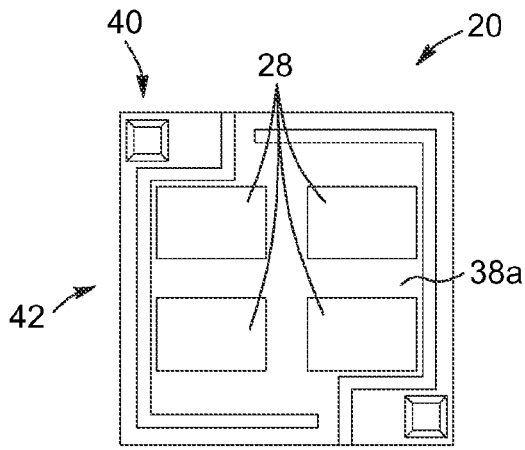
FIGS. 8B, 8D, 8F, 8H and 8J are top plan views of FIGS. 8A, 8C, 8E, 8G and 8I, respectively.
Figure 8C:
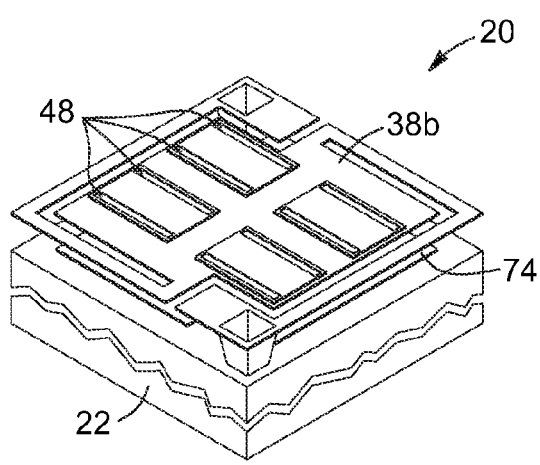
Figure 8D:
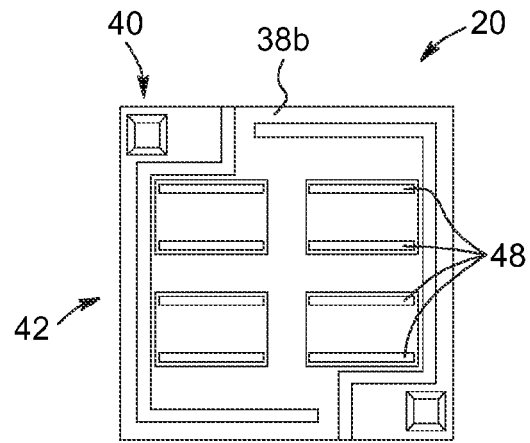
Figure 8E:
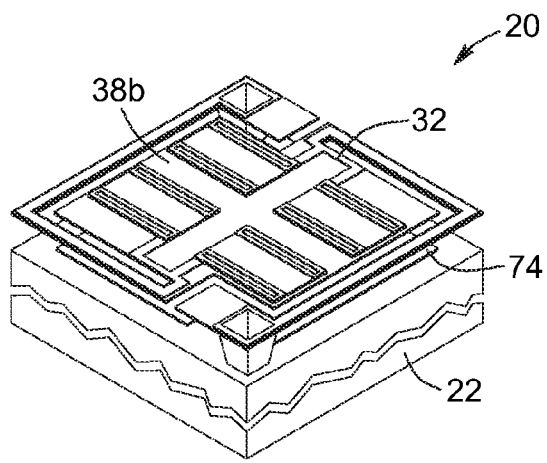
Figure 8F:
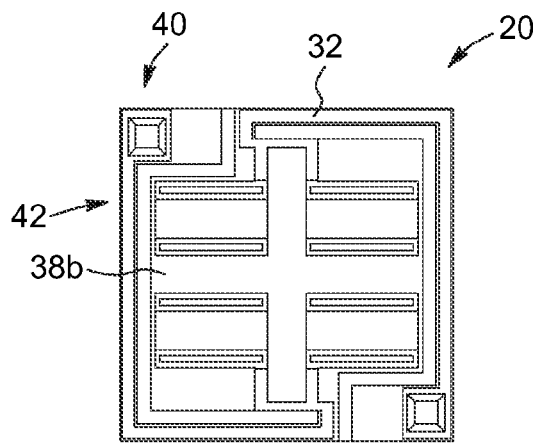
Figure 8G:
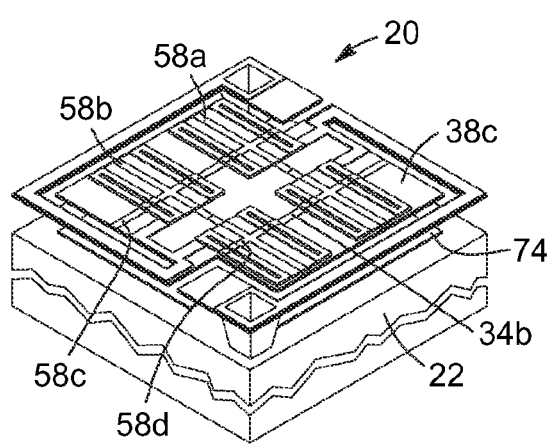
Figure 8H:
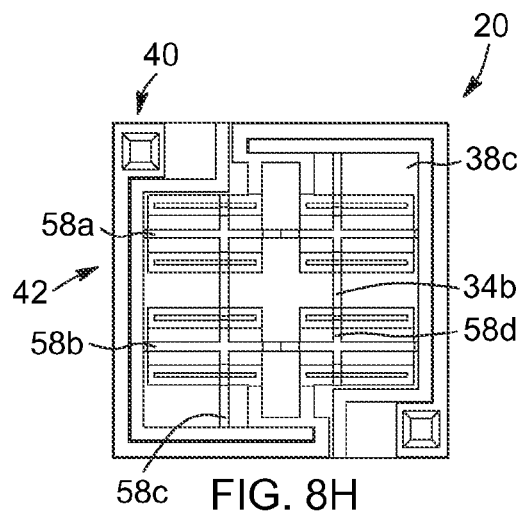
Figure 8I:
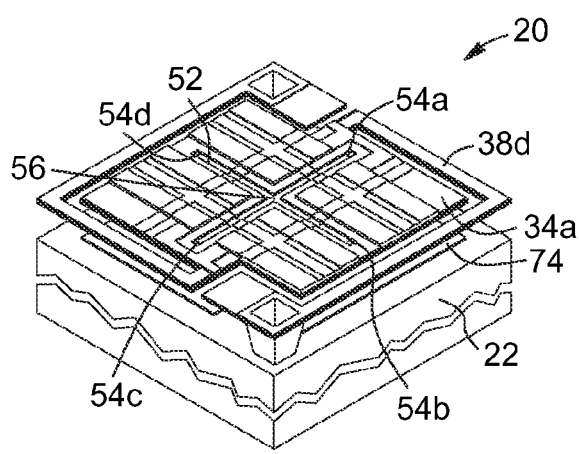
Figure 8J:
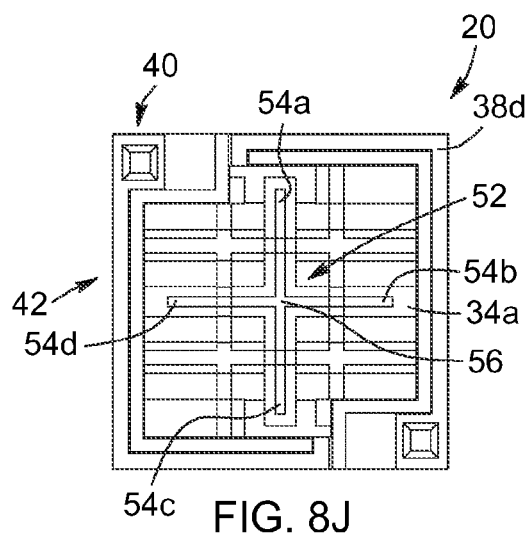
Figure 9A:
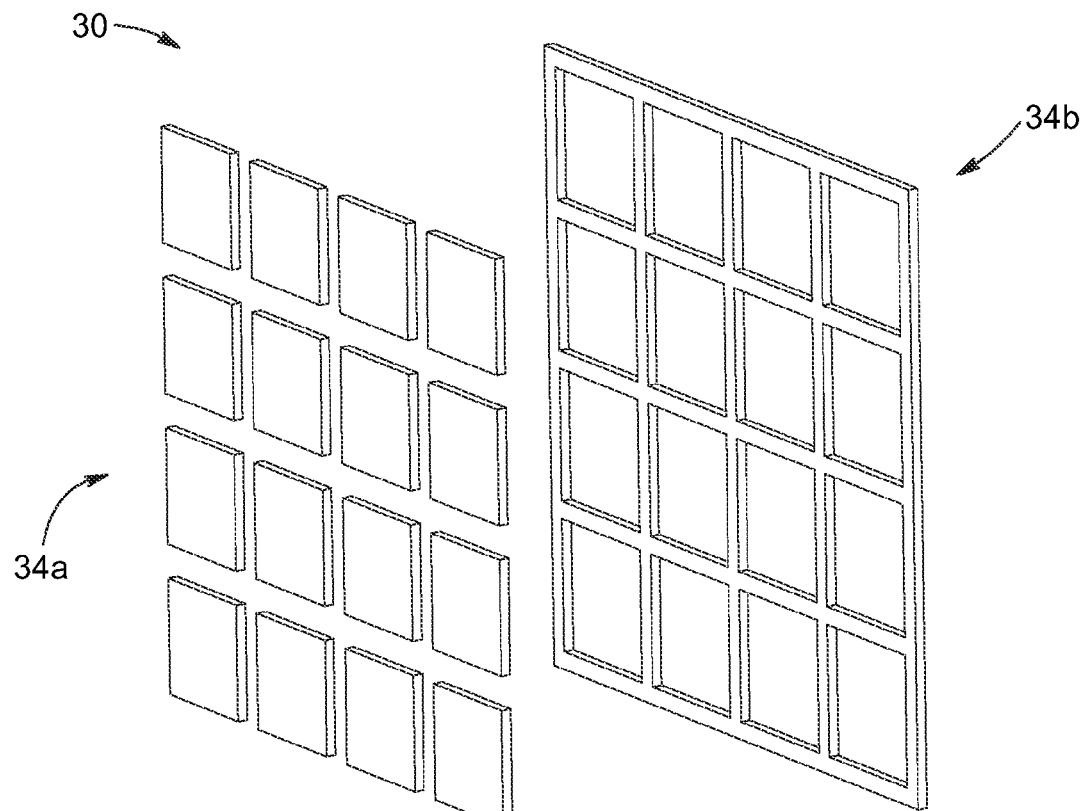
FIGS. 9A to 9H are schematic perspective (FIGS. 9A, 9C, 9E and 9G) and top plan (FIGS. 9B, 9D, 9F and 9H) views of various capacitive and inductive structures that can be patterned in the first and second electrically conductive layer of the optical absorber of the uncooled microbolometer detector in accordance with embodiments of the invention.
Figure 9B:
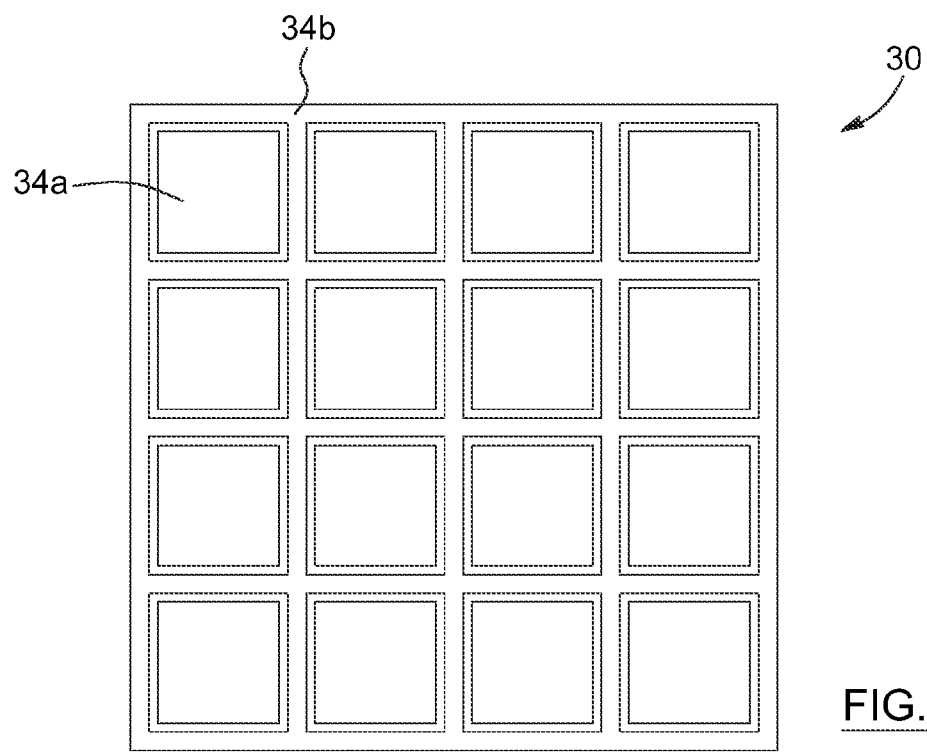
Figure 9C:
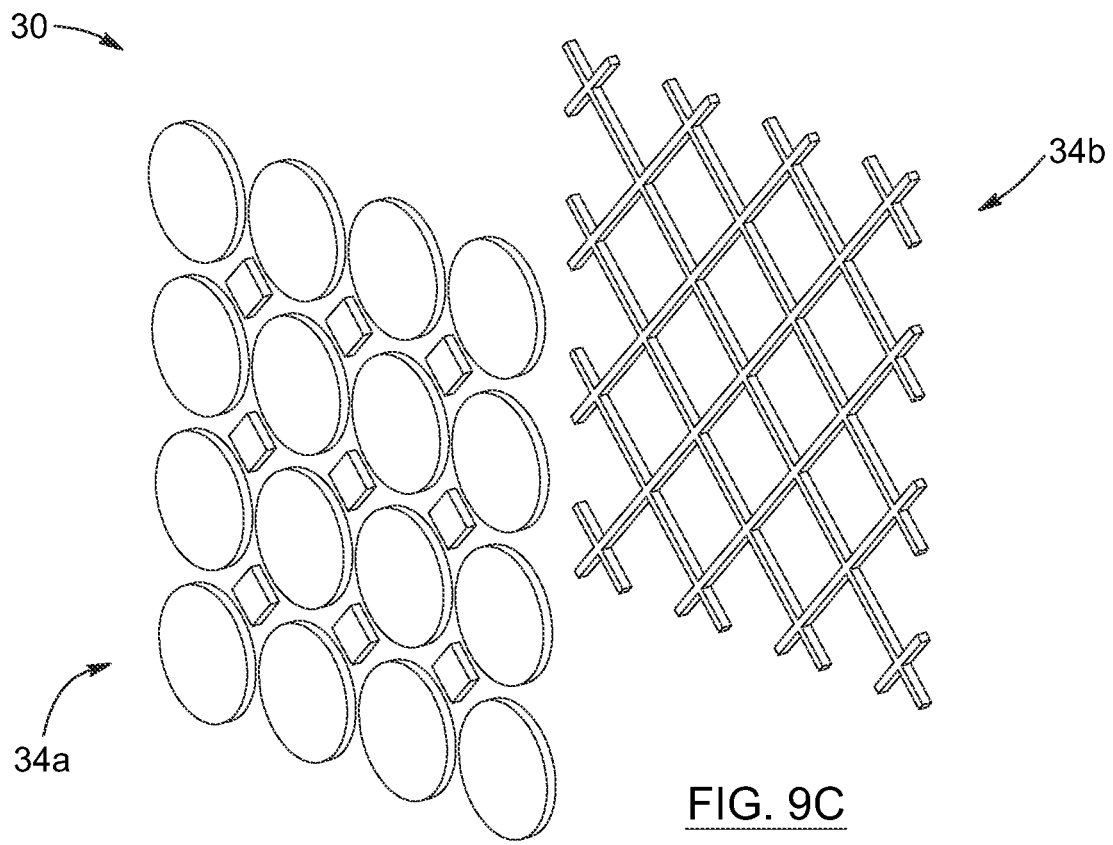
Figure 9D:
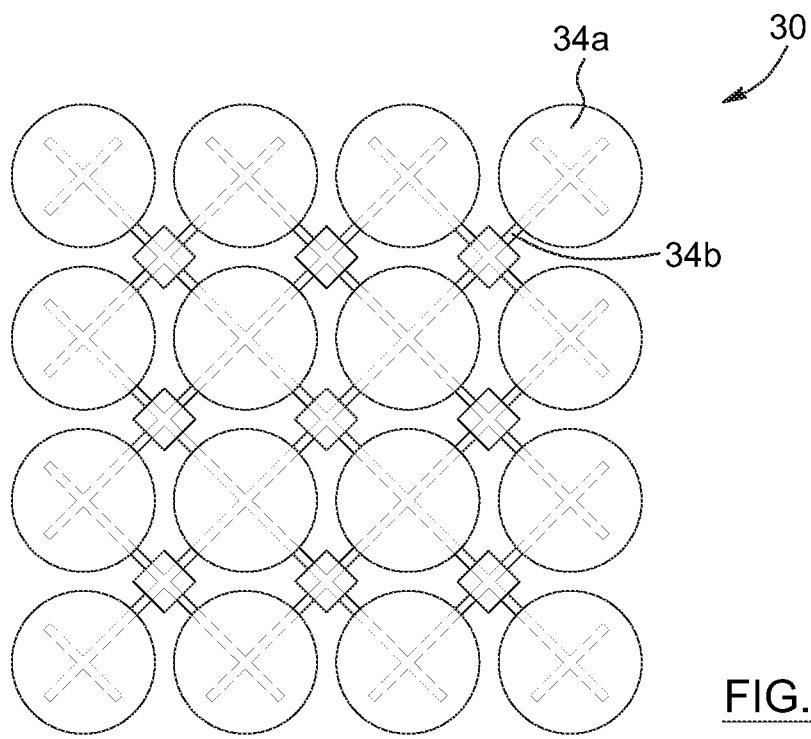
Figure 9E:
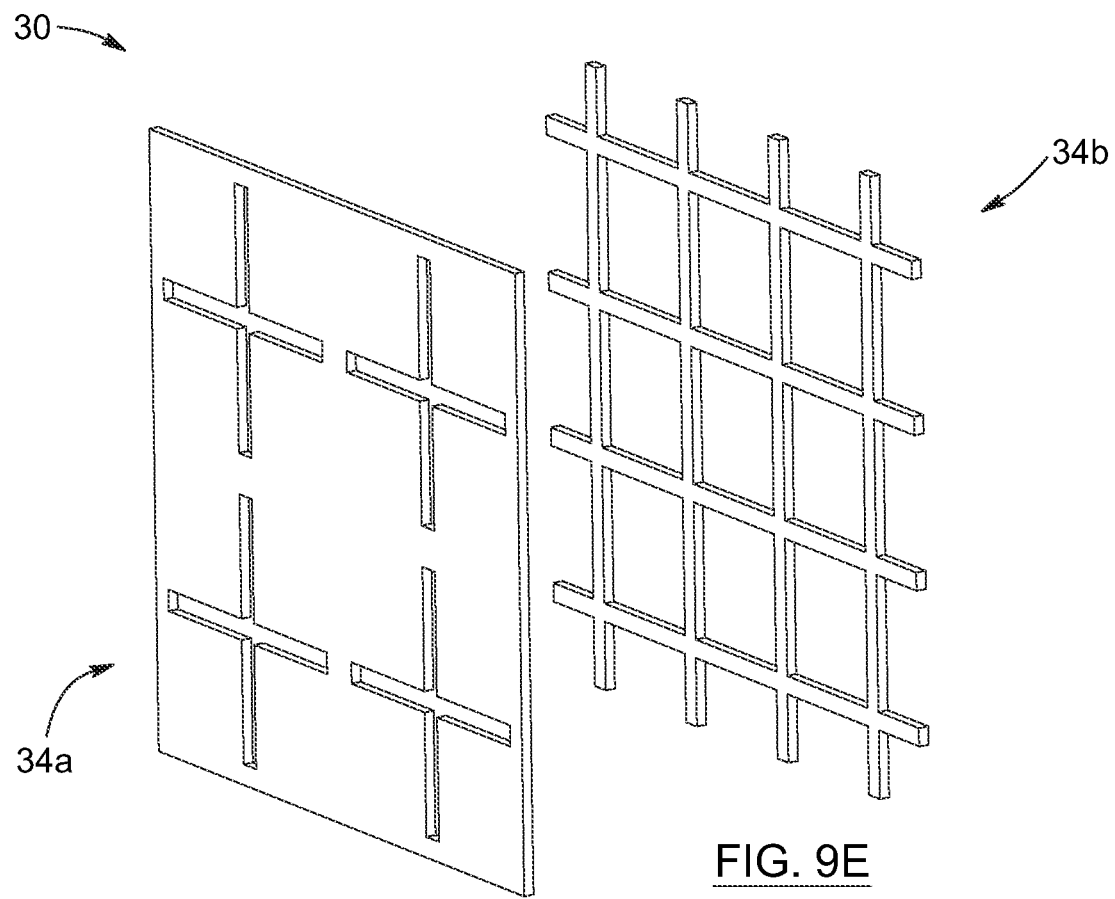
Figure 9F:
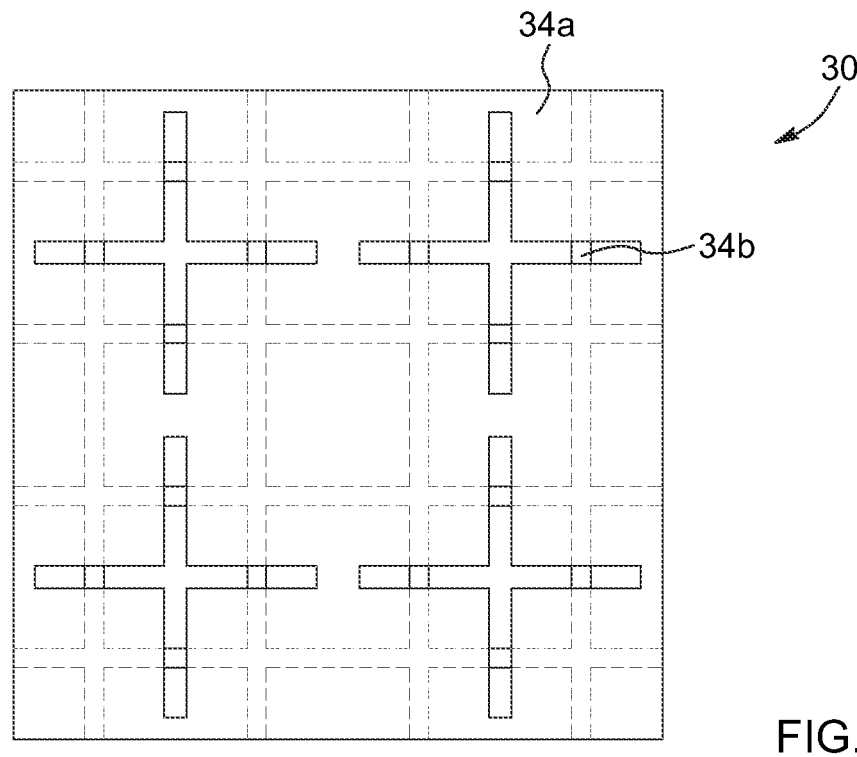
Figure 9G:
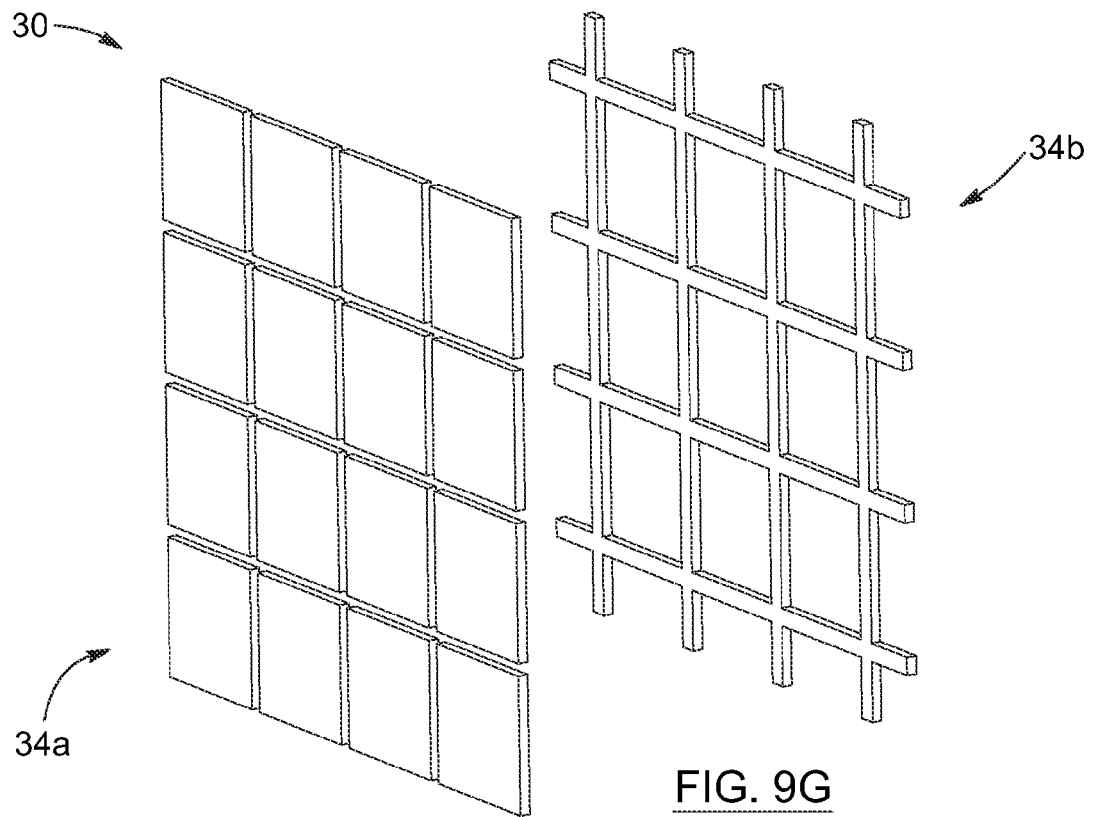
Figure 9H:
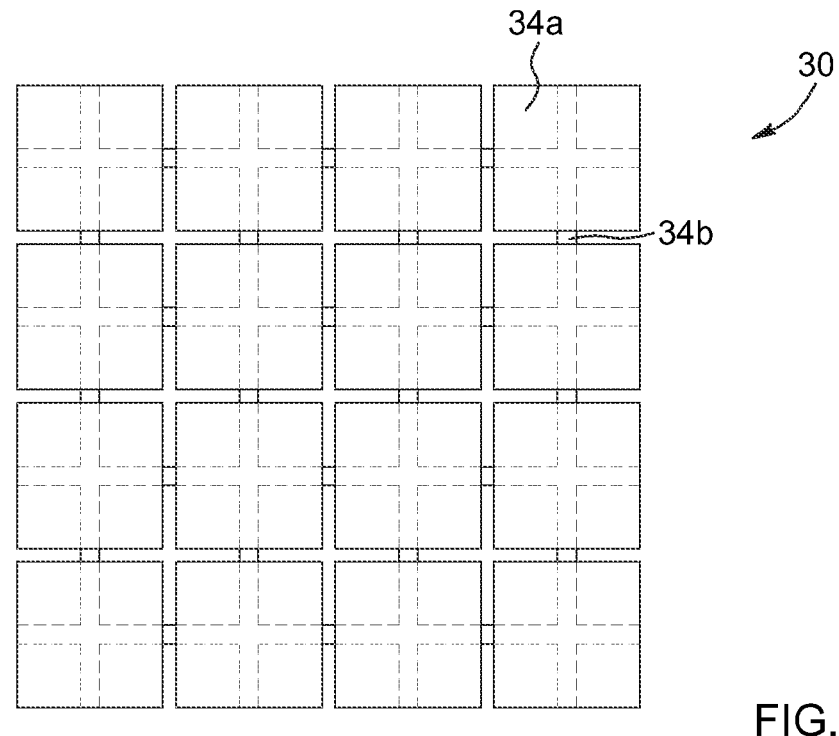

Referring now to FIGS. 6 and 7, in some embodiments, the microbolometer detector 20 may further include a spectral filter 60 supported above the platform 24 in a spaced relationship therewith.

In the illustrated embodiment, the spectral filter 60 is maintained above the platform 24 of the uncooled microbolometer detector 20 by two pillars 62 projecting upwardly from opposite corners of the platform 24, near the two posts 40 of the support structure 26. However, other types of support arrangement could be envisioned without departing from the scope of the invention.

As used herein, the term "spectral filter" is intended to refer to any structure that selectively transmits, either totally or partially, spectral components of the electromagnetic radiation incident thereonto. More specifically, the spectral filter 60 of FIGS. 6 and 7 is configured to pre-filter the incident electromagnetic radiation before it reaches the optical absorber 30 by removing therefrom undesirable spectral content, either by reflection or by absorption. Advantageously, the provision of the spectral filter 60 may eliminate the need for a window filter surrounding the uncooled microbolometer detector, thus reducing the cost of the microbolometer detector 20.

Depending on its intended application, the spectral filter 60 may be embodied by a low-pass filter (e.g. a capacitive filter), a high-pass filter (e.g. an inductive filter) or a bandpass or bandstop filter (e.g. a capacitive-inductive resonant filter). In the embodiment of FIGS. 6 and 7, the spectral filter 60 operates as a low-pass filter that transmits electromagnetic radiation of frequency lower than a predetermined cutoff frequency. The cut-off frequency will depend on the geometry of the resonant structure and also on the material properties. In such a configuration, the spectral filter 60 may reflect high-frequency radiation (e.g. infrared radiation) and thus may prevent the same from reaching the optical absorber 30. Advantageously, this may contribute to reduce high frequency noise that would degrade the optical performance of the uncooled microbolometer detector 20, for example as a result of the diffraction of the incident radiation and of the sensitivity to infrared radiation of some of the materials included in the microbolometer detector 20 (e.g. silicon nitride).

Figure 12B:
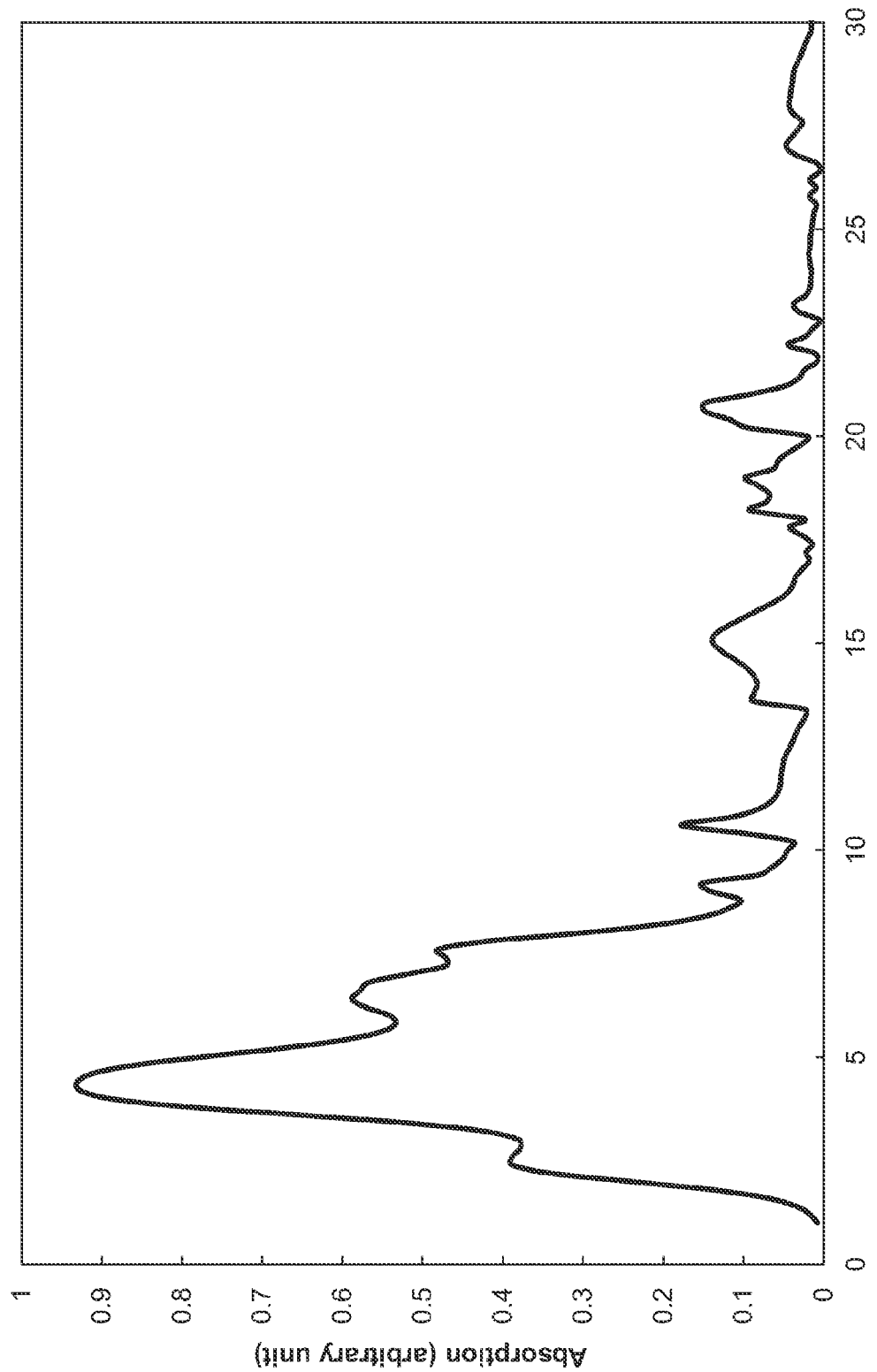

For example, referring now to FIG. 12B, there is shown a theoretical calculation of the absorption spectrum of the uncooled microbolometer detector shown in FIG. 6, which differs from the embodiment of FIG. 1 only by the provision of a low-pass capacitive spectral filter supported above the platform. As can be seen from the illustrated spectrum, the uncooled microbolometer detector still exhibits a main absorption peak near 5 THz, but the magnitudes of the satellite peaks above 10 THz are significantly reduced in comparison to the absorption spectrum shown in FIG. 12A.

More specifically, the spectral filter 60 shown in FIGS. 6 and 7 includes an electrically is conductive layer 64 patterned to form a capacitive filter and deposited on top of a support membrane 66 held above the platform 24 by the two pillars 62. As for the platform 24 and support structure 26 of the uncooled microbolometer detector 20, the support membrane 66 and pillars may be made of a low-stress and self-supporting material, for example silicon nitride or silicon dioxide. In the illustrated embodiment, the capacitive filter is a regular array of square patches 68 whose transmission spectrum and cut-off frequency depend on the size, separation and composition of the square patches. Advantageously, and as discussed above in relation with the capacitive structure of the optical absorber, the spectral response of the capacitive filter based on such a square patch array is independent of the polarization of the electromagnetic radiation incident thereonto. However, it will be understood that other embodiments can make use of different configurations for the capacitive filter.

Microbolometer Array

Figure 10:
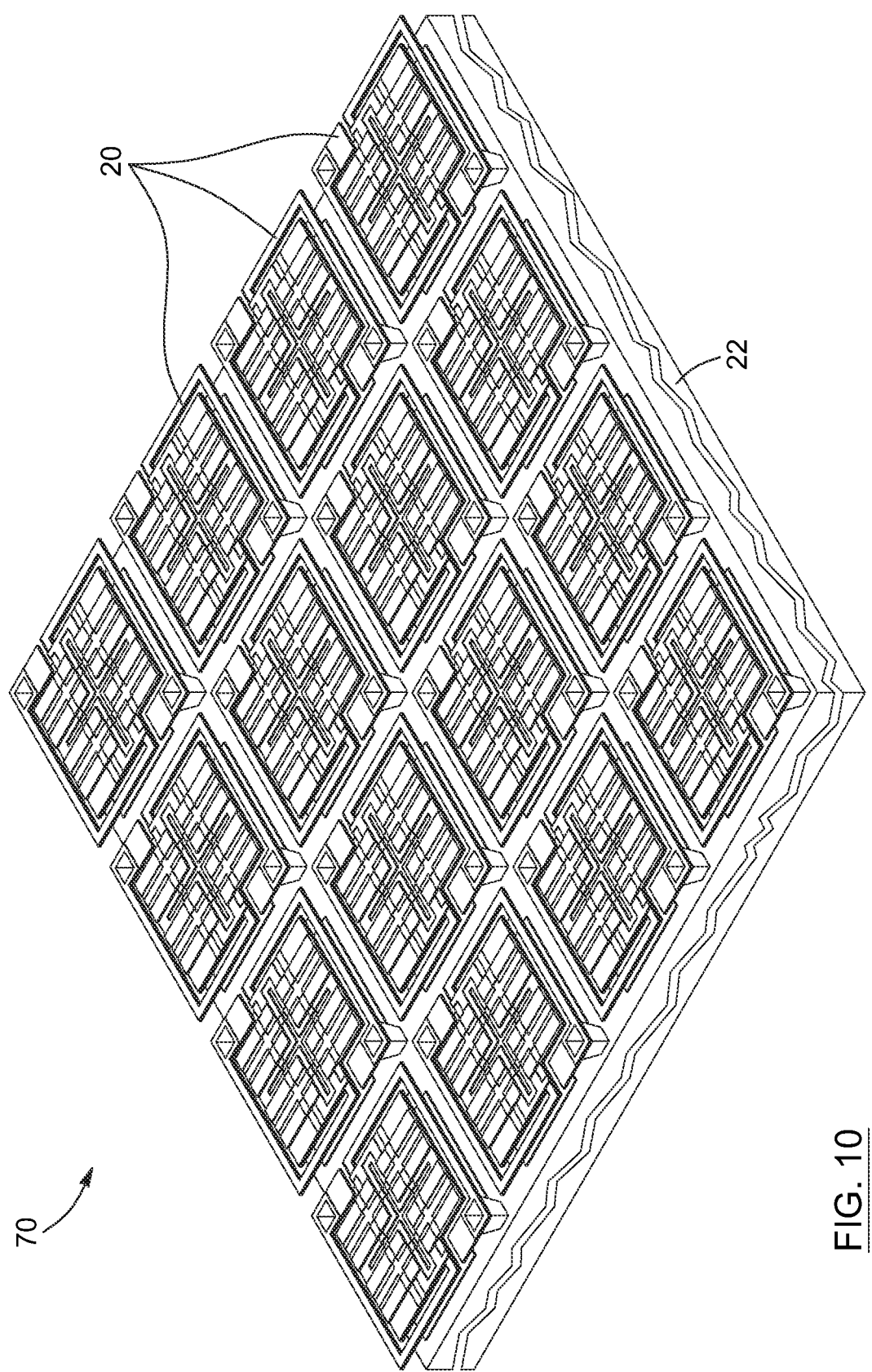
FIG. 10 is a schematic perspective view of a microbolometer array including a plurality of uncooled microbolometer detectors arranged in a two-dimensional array, in accordance with an embodiment of the invention.

Referring now to FIG. 10, in accordance with another aspect of the invention, there is provided a microbolometer array 70. The microbolometer array 70 includes a plurality of uncooled microbolometer detectors 20 such as described above, wherein the plurality of microbolometer detectors 20 is arranged in a two-dimensional array. While FIG. 10 depicts a four by four array for clarity, it will be recognized that in other embodiments, the total number of microbolometer detectors 20 in the array 70 could be higher or lower depending on the intended application. In some embodiments, the microbolometer array 70 may include microbolometer detectors 20 arranged in an array of pixels, wherein the spacing between two nearest-neighbor microbolometer detectors 20 (e.g. the pixel pitch) may be between about 12 and 312 μm.

It will also be understood that in order to meet the constraints of a particular application, the microbolometer array 70 may include identical or different microbolometer detectors 20 without departing from the scope of the present invention. In this regard, referring to FIGS. 11A and 11B, the microbolometer detectors 20 may include subsets 72a and 72b of microbolometer detectors 20, wherein the absorption spectrum of the uncooled microbolometer detectors of each subset is different from one another.

Figure 11A:
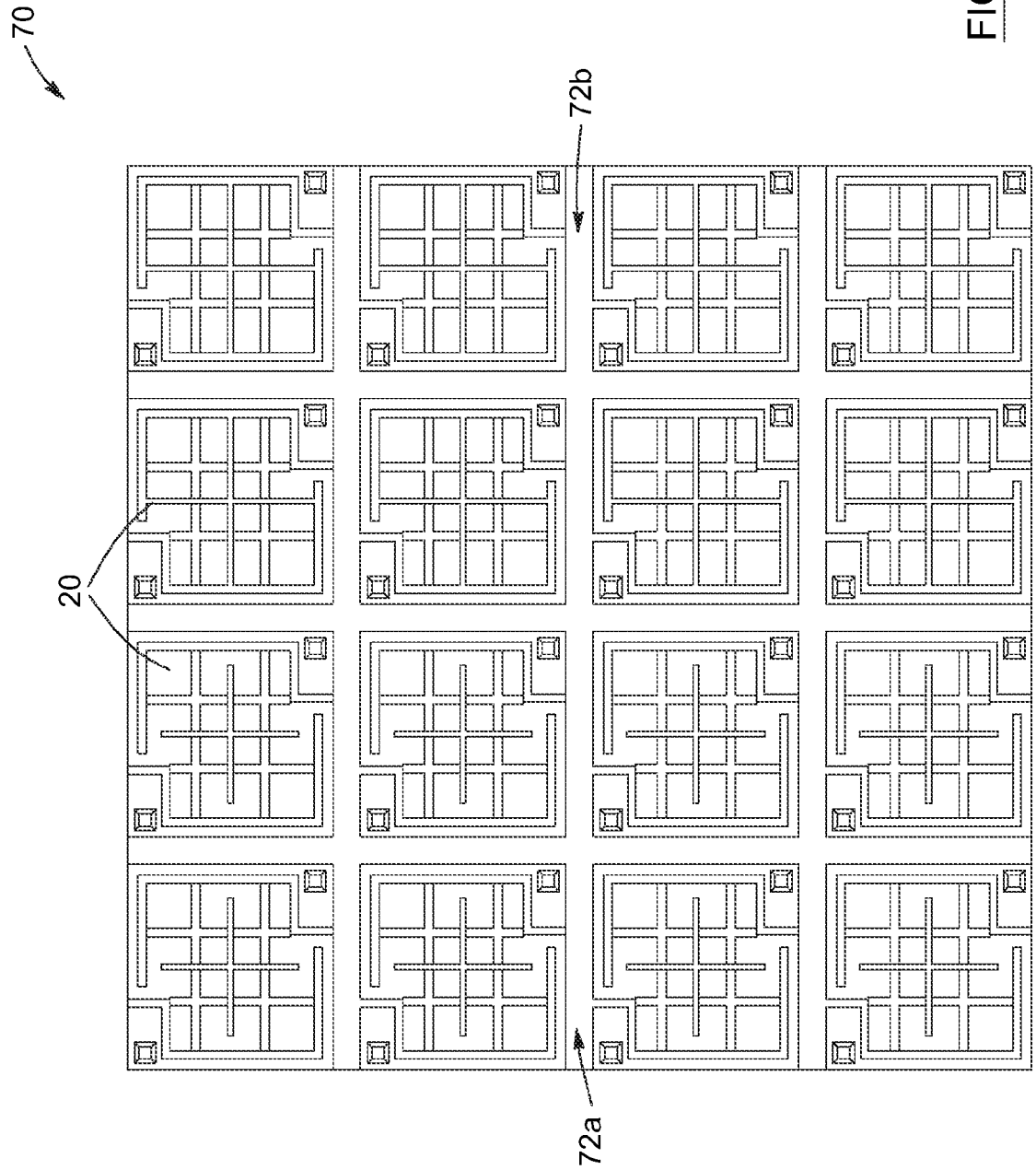
FIGS. 11A and 11B are schematic top views of a microbolometer array in accordance with another embodiment of the invention, wherein the plurality of uncooled microbolometer detectors is divided in a number of subsets of uncooled microbolometer detectors, the absorption spectrum of the uncooled microbolometer detectors of each subset being different from one another.
Figure 11B:
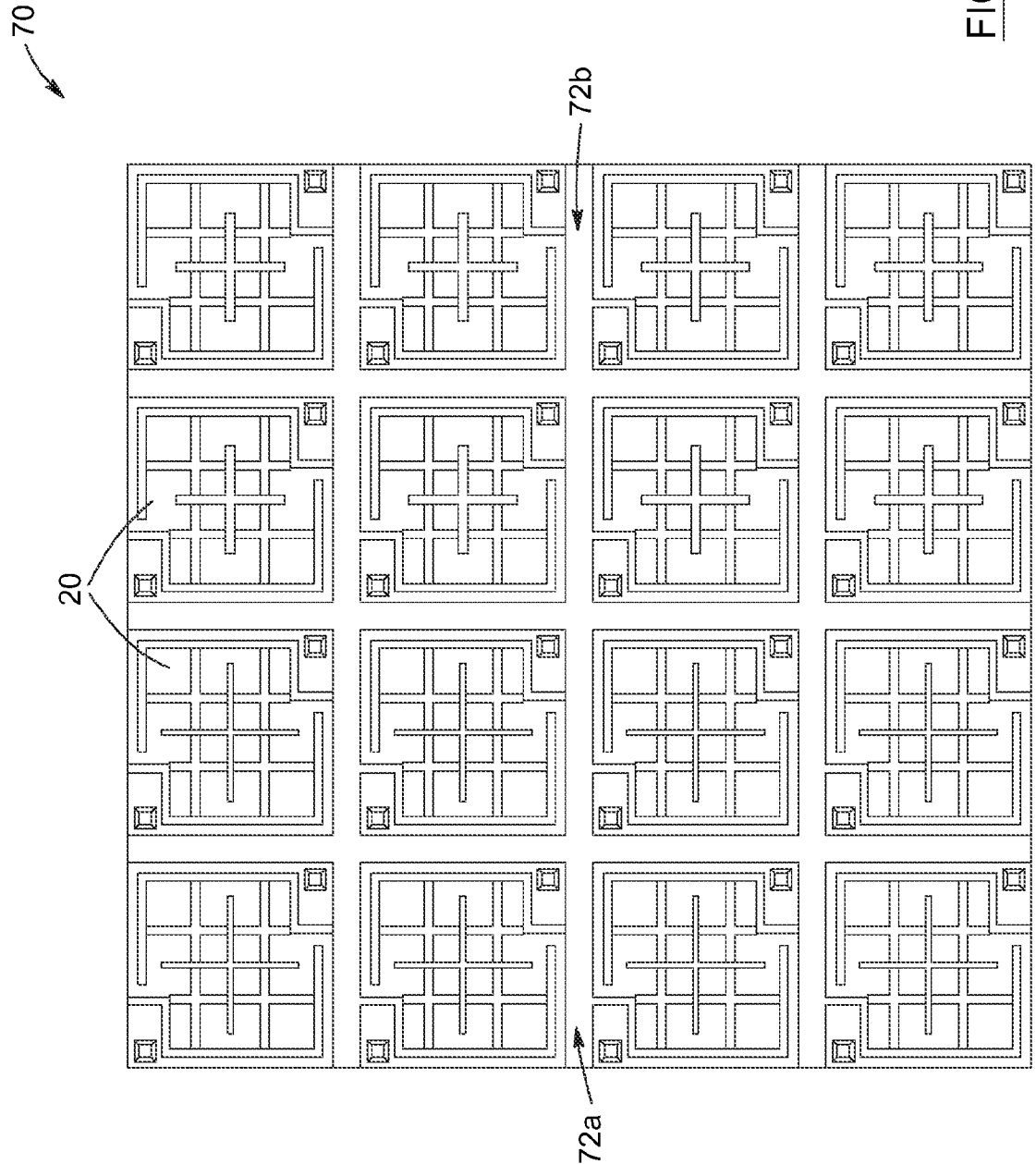

More specifically, in FIG. 11A, the optical absorber of one subset 72a of microbolometer detectors 20 includes a capacitive structure embodied by a cross-shaped slot patterned through the first electrically conductive layer, wherein the four arms of the slots do not extend outwardly to the peripheral edge of the platform. On the other hand, the optical absorber of the other subset 72b of microbolometer detectors 20 includes a capacitive structure embodied by a cross-shaped slot patterned through the first electrically conductive layer, wherein the four arms of the slots extend outwardly to the peripheral edge of the platform. Furthermore, in FIG.

11B, the optical absorbers in the two subsets 72a and 72b of microbolometer detectors differ in terms of the length and width of the cross-shaped slots patterned through the first electrically conductive layer. It will thus be understood that, in such embodiments, the absorption spectrum of each pixel, row of pixels or cluster of pixels of the array may be optimized independently.

It should be noted that while the microbolometer detectors 20 are arranged to form a two-dimensional array in the embodiments of FIGS. 10 and 11, they may alternatively be configured as a linear array or be provided at arbitrary locations that do not conform to a specific pattern.

Of course, numerous modifications could be made to the embodiments described above without departing from the scope of the present invention.

The invention claimed is:

1. An uncooled microbolometer detector comprising:
   a substrate;
   a platform held above the substrate by a support structure;
   at least one thermistor provided on the platform; and
   an optical absorber extending on the platform over and in thermal contact with the at least one thermistor, the optical absorber comprising a first electrically conductive layer patterned to form a capacitive structure operating as a low-pass spectral filter and a second electrically conductive layer patterned to form an inductive structure operating as a high-pass spectral filter, the capacitive structure and the inductive structure together forming a resonant structure defining an absorption spectrum of the optical absorber, the optical absorber being exposed to electromagnetic radiation and absorbing the electromagnetic radiation according to the absorption spectrum.

2. The uncooled microbolometer detector according to claim 1, wherein the optical absorber further comprises an electrically insulating layer disposed between the first and second electrically conductive layers.

3. The uncooled microbolometer detector according to claim 1, wherein:
   the capacitive structure comprises a cross-shaped slot patterned through the first electrically conductive layer; and
   the inductive structure comprises inductive elements patterned in the second electrically conductive layer, the inductive elements being electromagnetically coupled to the cross-shaped slot.

4. The uncooled microbolometer detector according to claim 3, wherein the cross-shaped slot has four arms extending outwardly from a center thereof, with adjacent arms extending at right angles relative to each other, and wherein each inductive element extends substantially orthogonally across a corresponding one of the four arms of the cross-shaped slot.

5. The uncooled microbolometer detector according to claim 1, wherein each of the least one thermistor comprises a thin film of one of vanadium oxide and amorphous silicon.

6. The uncooled microbolometer detector according to claim 1, wherein the optical absorber is configured to absorb the electromagnetic radiation in a wavelength range of between about 30 and 3000 micrometers.

7. The uncooled microbolometer detector according to claim 1, wherein the absorption spectrum of the uncooled microbolometer detector comprises a plurality of absorption bands.

8. The uncooled microbolometer detector according to claim 1, further comprising a radiation reflecting mirror provided on the substrate and disposed under the platform.

9. The uncooled microbolometer detector according to claim 1, further comprising a spectral filter supported above the platform in a spaced relationship therewith and configured to pre-filter the electromagnetic radiation before the electromagnetic radiation impinges onto the optical absorber.

10. The uncooled microbolometer detector according to claim 9, wherein the spectral filter comprises a low-pass filter.

11. The uncooled microbolometer detector according to claim 10, wherein the low-pass filter is a capacitive filter.

12. A microbolometer array comprising a plurality of uncooled microbolometer detectors according to claim 1, wherein the plurality of microbolometer detectors is arranged in a two-dimensional array.

13. The microbolometer array according to claim 12, wherein the plurality of uncooled microbolometer detectors is divided in a number of subsets of uncooled microbolometer detectors, the absorption spectrum of the uncooled microbolometer detectors of each subset being different from one another.

* * * * *